(12) United States Patent
Munoz et al.

(10) Patent No.: US 10,489,156 B2
(45) Date of Patent: Nov. 26, 2019

(54) TECHNIQUES TO VERIFY AND AUTHENTICATE RESOURCES IN A DATA CENTER COMPUTER ENVIRONMENT

(71) Applicant: INTEL CORPORATION, Santa Clara, CA (US)

(72) Inventors: Alberto J. Munoz, Los Altos, CA (US); Murugasamy K. Nachimuthu, Beaverton, OR (US); Mohan J. Kumar, Aloha, OR (US); Wojciech Powiertowski, Beaverton, OR (US); Sergiu D. Ghetie, Hillsboro, OR (US); Neeraj S. Upasani, Portland, OR (US); Sagar V. Dalvi, Hillsboro, OR (US); Chukwunenye S. Nnebe, Folsom, CA (US); Jeanne Guillory, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 157 days.

(21) Appl. No.: 15/656,798

(22) Filed: Jul. 21, 2017

(65) Prior Publication Data
US 2018/0026800 A1 Jan. 25, 2018

Related U.S. Application Data

(60) Provisional application No. 62/365,969, filed on Jul. 22, 2016, provisional application No. 62/376,859, (Continued)

(51) Int. Cl.
*H04L 29/06* (2006.01)
*G06F 9/30* (2018.01)
(Continued)

(52) U.S. Cl.
CPC ...... *G06F 9/30036* (2013.01); *B25J 15/0014* (2013.01); *B65G 1/0492* (2013.01);
(Continued)

(58) Field of Classification Search
CPC ...... H04L 9/3263; H04L 47/82; G06F 3/0613
(Continued)

(56) References Cited

U.S. PATENT DOCUMENTS

2003/0009365 A1* 1/2003 Tynan ............... G06F 16/958
705/50
2007/0005992 A1* 1/2007 Schluessler ............ G06F 21/54
713/193
(Continued)

OTHER PUBLICATIONS

International Search Report received for PCT Patent Application No. PCT/US2017/043343, dated Nov. 8, 2017, 3 pages.

*Primary Examiner* — Evans Desrosiers

(57) ABSTRACT

Embodiments are generally directed apparatuses, methods, techniques and so forth to receive a sled manifest comprising identifiers for physical resources of a sled, receive results of an authentication and validation operations performed to authenticate and validate the physical resources of the sled, determine whether the results of the authentication and validation operations indicate the physical resources are authenticate or not authenticate. Further and in response to the determination that the results indicate the physical resources are authenticated, permit the physical resources to process a workload, and in response to the determination that the results indicate the physical resources are not authenticated, prevent the physical resources from processing the workload.

25 Claims, 18 Drawing Sheets

Related U.S. Application Data filed on Aug. 18, 2016, provisional application No. 62/427,268, filed on Nov. 29, 2016.

(51) Int. Cl.

| | | |
|---|---|---|
| H03M 7/40 | (2006.01) |
| H03M 7/30 | (2006.01) |
| G06F 16/901 | (2019.01) |
| G06F 3/06 | (2006.01) |
| G11C 7/10 | (2006.01) |
| H05K 7/14 | (2006.01) |
| G06F 1/18 | (2006.01) |
| G06F 13/40 | (2006.01) |
| H05K 5/02 | (2006.01) |
| G08C 17/02 | (2006.01) |
| H04L 12/24 | (2006.01) |
| H04L 29/08 | (2006.01) |
| H04L 12/26 | (2006.01) |
| H04L 12/851 | (2013.01) |
| H04Q 11/00 | (2006.01) |
| G06F 9/50 | (2006.01) |
| H04L 12/911 | (2013.01) |
| G06F 12/109 | (2016.01) |
| G11C 14/00 | (2006.01) |
| G11C 5/02 | (2006.01) |
| G11C 11/56 | (2006.01) |
| G02B 6/44 | (2006.01) |
| G06F 8/65 | (2018.01) |
| G06F 12/14 | (2006.01) |
| G06F 13/16 | (2006.01) |
| H04B 10/25 | (2013.01) |
| G06F 9/4401 | (2018.01) |
| G02B 6/38 | (2006.01) |
| G02B 6/42 | (2006.01) |
| B25J 15/00 | (2006.01) |
| B65G 1/04 | (2006.01) |
| H05K 7/20 | (2006.01) |
| H04L 12/931 | (2013.01) |
| H04L 12/939 | (2013.01) |
| H04W 4/02 | (2018.01) |
| H04L 12/751 | (2013.01) |
| G06F 13/42 | (2006.01) |
| H05K 1/18 | (2006.01) |
| G05D 23/19 | (2006.01) |
| G05D 23/20 | (2006.01) |
| H04L 12/927 | (2013.01) |
| H05K 1/02 | (2006.01) |
| H04L 12/781 | (2013.01) |
| H04Q 1/04 | (2006.01) |
| G06F 12/0893 | (2016.01) |
| H05K 13/04 | (2006.01) |
| G11C 5/06 | (2006.01) |
| G06F 11/14 | (2006.01) |
| G06F 11/34 | (2006.01) |
| G06F 12/0862 | (2016.01) |
| G06F 15/80 | (2006.01) |
| H04L 12/919 | (2013.01) |
| G06F 12/10 | (2016.01) |
| G06Q 10/06 | (2012.01) |
| G07C 5/00 | (2006.01) |
| H04L 12/28 | (2006.01) |
| H04L 29/12 | (2006.01) |
| H04L 9/06 | (2006.01) |
| H04L 9/14 | (2006.01) |
| H04L 9/32 | (2006.01) |
| H04L 12/933 | (2013.01) |
| H04L 12/947 | (2013.01) |
| H04L 12/811 | (2013.01) |
| G06F 9/38 | (2018.01) |
| G06F 9/54 | (2006.01) |
| H04W 4/80 | (2018.01) |
| G06Q 10/08 | (2012.01) |
| G06Q 10/00 | (2012.01) |
| G06Q 50/04 | (2012.01) |

(52) U.S. Cl.
CPC ......... *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01); *G06F 1/183* (2013.01); *G06F 3/061* (2013.01); *G06F 3/064* (2013.01); *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/3887* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 9/544* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3084* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16*

(2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/00* (2013.01); *H04L 49/15* (2013.01); *H04L 49/25* (2013.01); *H04L 49/357* (2013.01); *H04L 49/45* (2013.01); *H04L 49/555* (2013.01); *H04L 67/02* (2013.01); *H04L 67/10* (2013.01); *H04L 67/1004* (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/306* (2013.01); *H04L 67/34* (2013.01); *H04L 69/04* (2013.01); *H04L 69/329* (2013.01); *H04Q 1/04* (2013.01); *H04Q 11/00* (2013.01); *H04Q 11/0003* (2013.01); *H04Q 11/0005* (2013.01); *H04Q 11/0062* (2013.01); *H04Q 11/0071* (2013.01); *H04W 4/023* (2013.01); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1447* (2013.01); *H05K 7/1461* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/087* (2013.01); *G06Q 10/20* (2013.01); *G06Q 50/04* (2013.01); *G08C 2200/00* (2013.01); *H04B 10/25* (2013.01); *H04L 41/12* (2013.01); *H04L 41/5019* (2013.01); *H04L 43/065* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/80* (2018.02); *H05K 7/1485* (2013.01); *H05K 2201/066* (2013.01); *H05K 2201/10121* (2013.01); *H05K 2201/10159* (2013.01); *H05K 2201/10189* (2013.01); *Y02D 10/14* (2018.01); *Y02D 10/151* (2018.01); *Y02P 90/30* (2015.11); *Y10S 901/01* (2013.01)

(58) Field of Classification Search
USPC .......................................................... 713/156
See application file for complete search history.

(56) References Cited

U.S. PATENT DOCUMENTS

2009/0300349 A1 12/2009 Hashimoto et al.
2010/0293383 A1* 11/2010 Coughlin .............. G06F 21/606
                                                                               713/176
2015/0236856 A1 8/2015 Moore et al.

* cited by examiner

Data Center 300

1200

Sled 1304

1320

1400

TECHNIQUES TO VERIFY AND AUTHENTICATE RESOURCES IN A DATA CENTER COMPUTER ENVIRONMENT

RELATED CASES

This application claims priority to U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016, each of which are hereby incorporated by reference in their entirety.

TECHNICAL FIELD

Embodiments described herein generally include verifying hardware and software resources in a data center computer environment.

BACKGROUND

A computing data center may include one or more computing systems including a plurality of compute nodes that may include various compute structures (e.g., servers or sleds) and may be physically located on multiple racks. The sleds may include a number of physical resources interconnected via one or more compute structures and buses. In some instances, a computing data center including the sleds and physical resources may process sensitive, confidential and/or valuable information such as medical or financial records, proprietary business data, and licensed multimedia content. Thus, customers of processing this information may require strict control of the hardware and software used to process this valuable information to prevent attacks and ensure the integrity of the data center's physical resources. Thus, embodiments may be directed to preventing changes to hardware and software and solving other problems to ensure the integrity of a data center.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
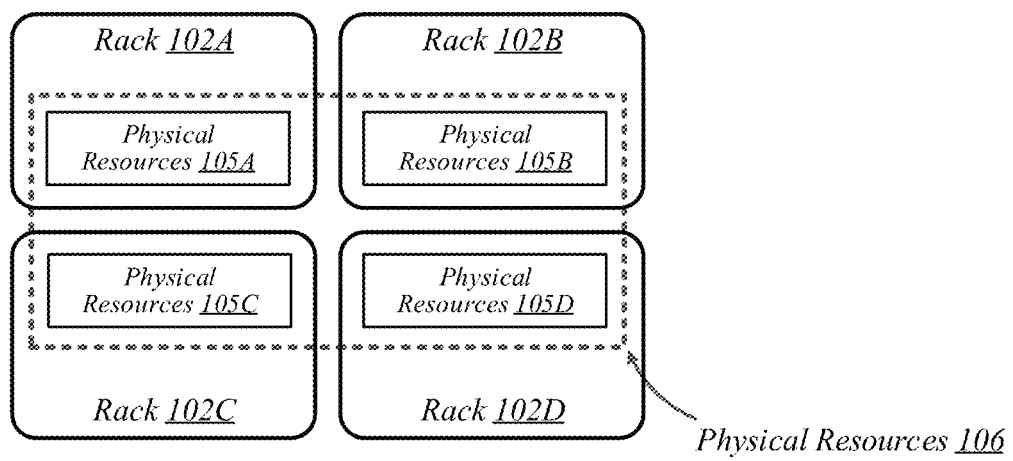
FIG. 1 illustrates an example of a data center.

Various embodiments may generally be directed to verifying and authenticating resources in a data center computer environment. More specifically, embodiments include authenticating and verifying each physical resource of a sled via a verification controller of the sled. The verification controller may be a secure hardware component capable of processing instructions stored in a secure hardware location, for example. The verification controller may generate results of the verification and authentication of the resources indicating whether they are successfully verified and authenticated or not.

In embodiments, the results and a sled manifest indicating each of the physical resources may be provided to a pod management controller. The pod management controller may verify and authenticate the results and the sled manifest and based on the verification and authentication of the results and the sled manifest; the pod management controller may permit or prevent physical resources to be used in composed nodes. These and other details will become more apparent in the following description.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a conceptual overview of a data center 100 that may be representative of a data center or other type of computing network in/for which one or more techniques described herein may be implemented per various embodiments. As shown in FIG. 1, data center 100 may contain a plurality of racks, each of which may house computing equipment comprising a respective set of physical resources. In the non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

Figure 2:
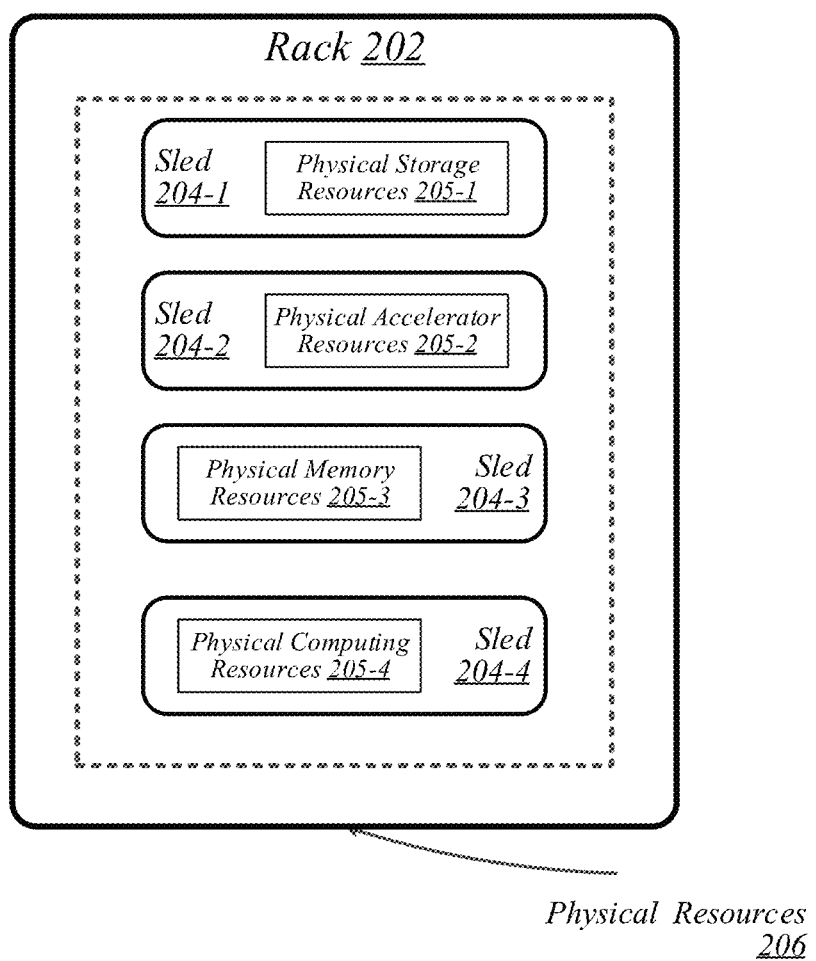
FIG. 2 illustrates an example of a rack.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulability resource sleds. Furthermore, in the illustrative embodiment, the racks 102A, 102B, 102C, 102D include integrated power sources that receive higher current than typical for power sources. The increased current enables the power sources to provide additional power to the components on each sled, enabling the components to operate at higher than typical frequencies. FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 204-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulability sleds comprising disaggregated resources, each type of resource can be upgraded independently of each other and at their own optimized refresh rate.

Figure 3:
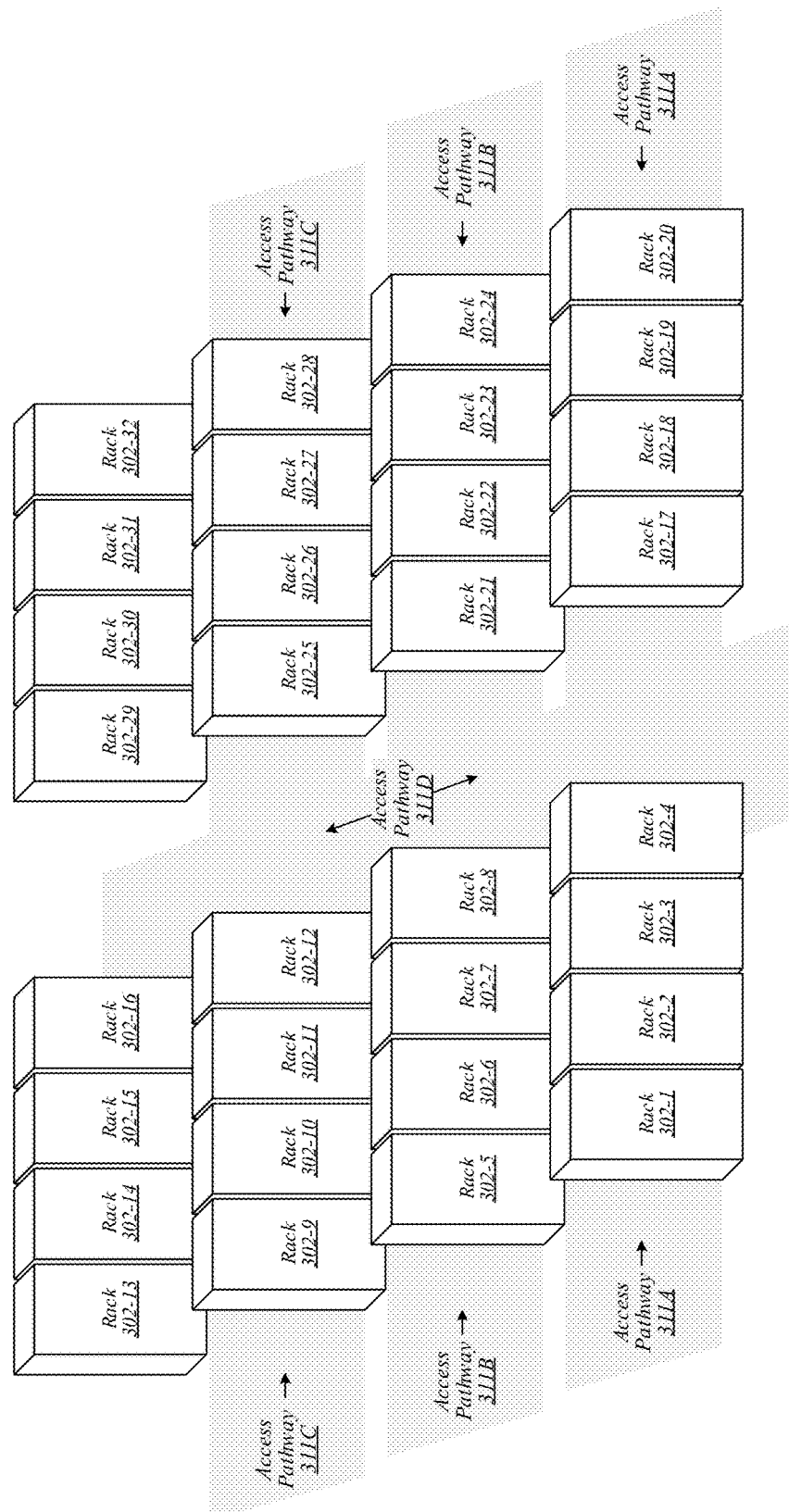
FIG. 3 illustrates an example of a data center.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
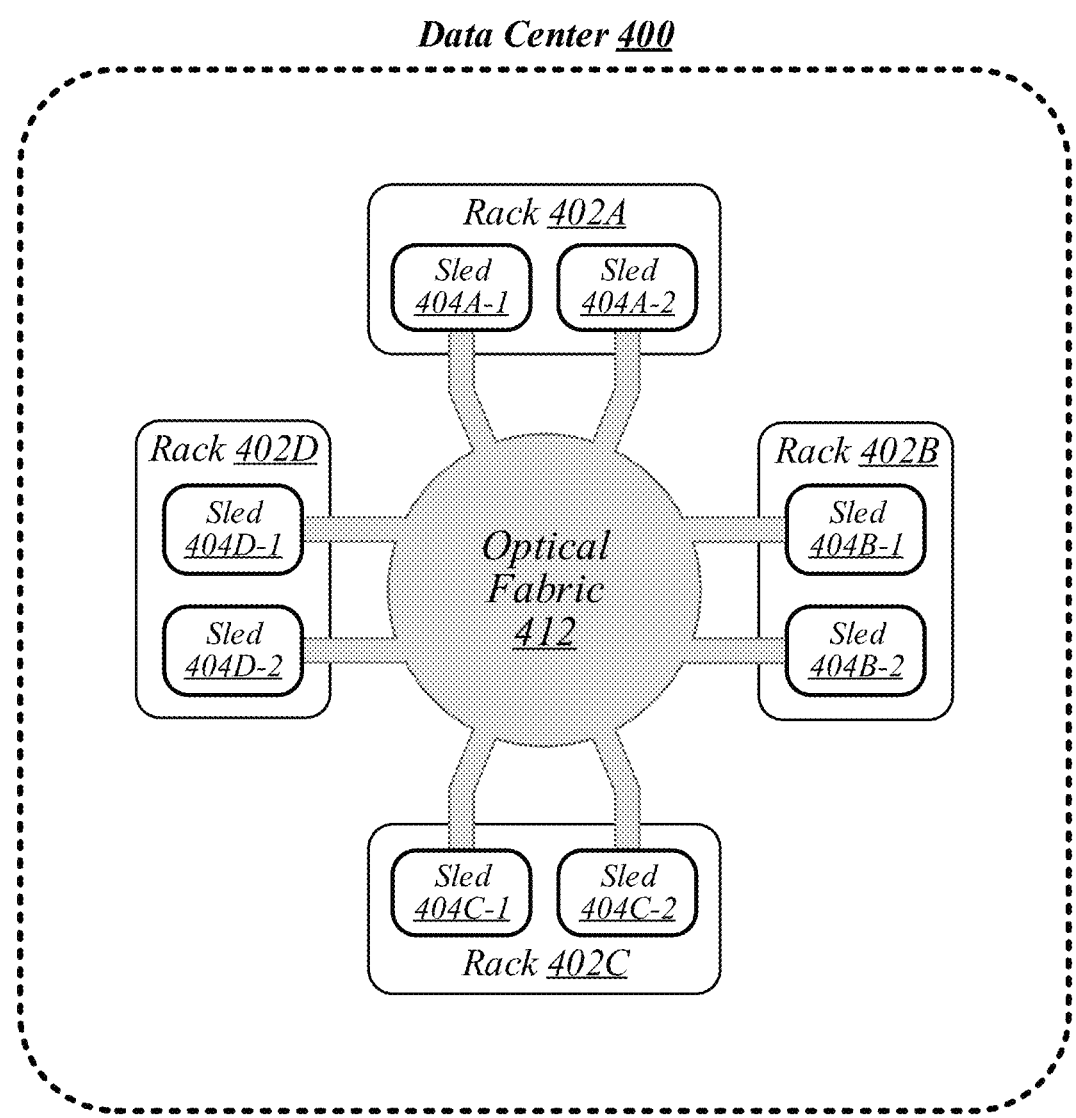
FIG. 4 illustrates an example of a data center.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
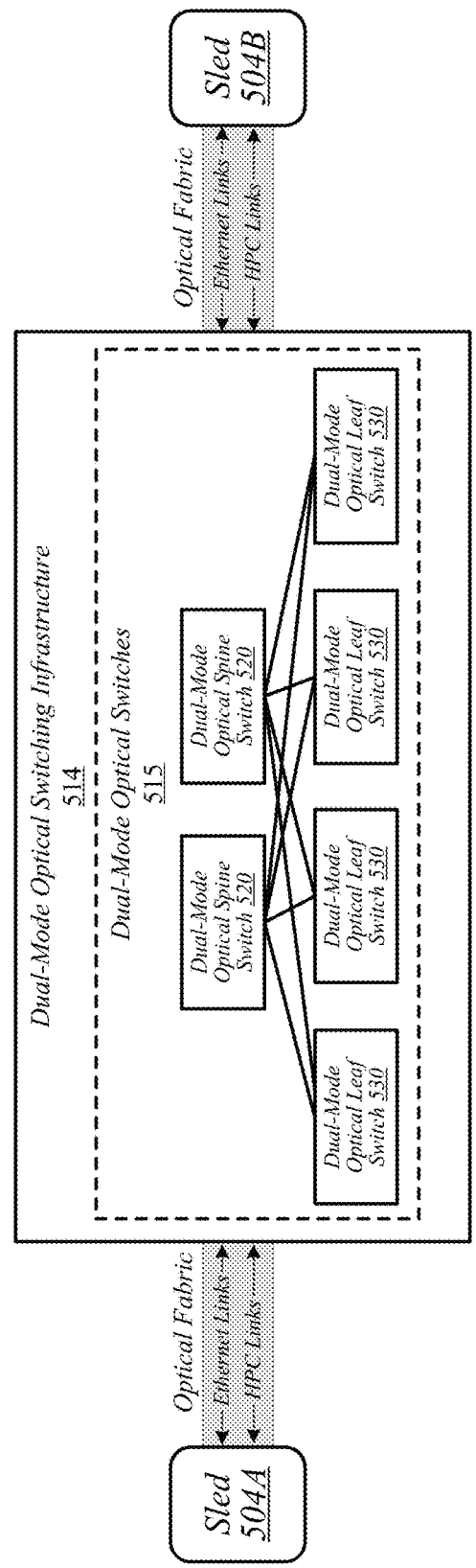
FIG. 5 illustrates an example of a switching infrastructure.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In embodiments, the dual-mode switch may be a single physical network wire that may be capable of carrying Ethernet or Omni-Path communication, which may be auto-detected by the dual-mode optical switch 515 or configured by the Pod management controller. This allows for the same network to be used for Cloud traffic (Ethernet) or High Performance Computing (HPC), typically Omni-Path or Infiniband. Moreover, and in some instances, an Omni-Path protocol may carry Omni-Path communication and Ethernet communication. In some embodiments, dual-mode optical switches 515 may constitute leaf switches 530 in a leaf-spine architecture additionally including one or more dual-mode optical spine switches 520. Note that in some embodiments, the architecture may not be a leaf-spine architecture, but may be a two-ply switch architecture to connect directly to the sleds.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
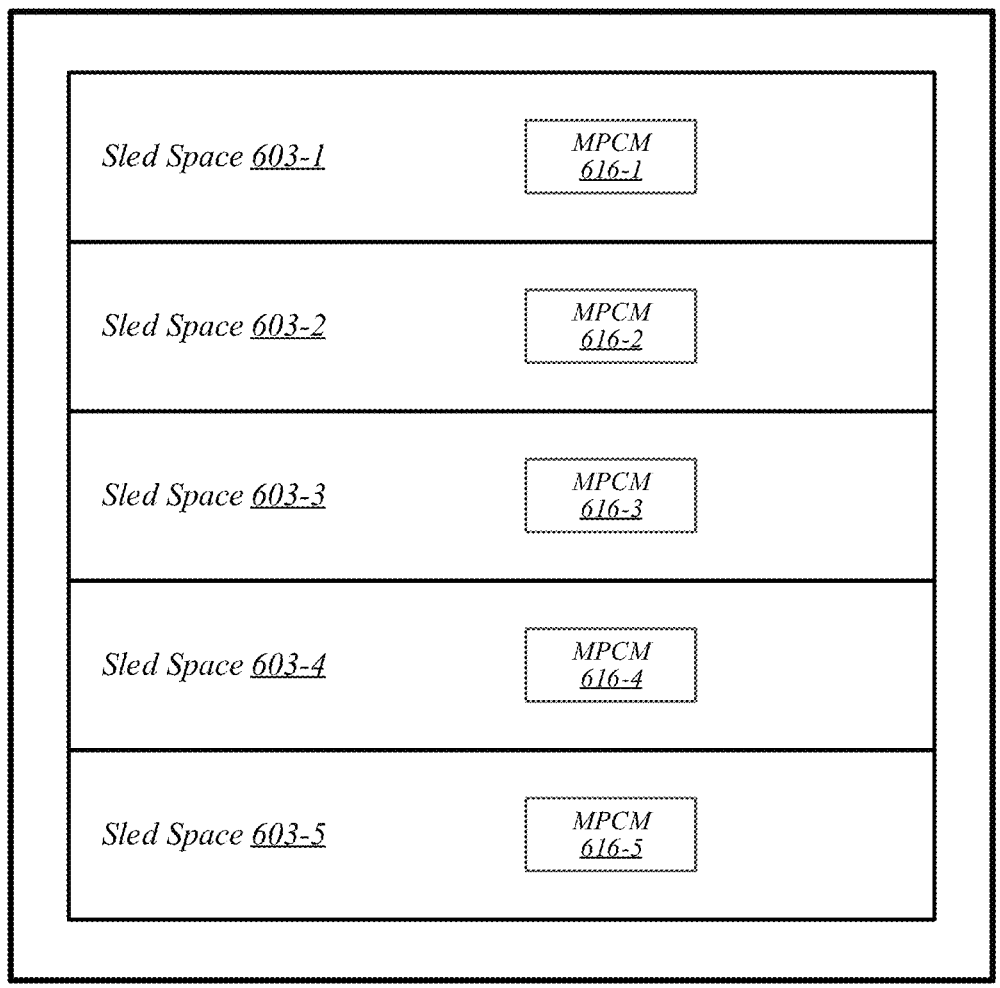
FIG. 6 illustrates an example of a data center.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5. In some instances, when a sled is inserted into any given one of sled spaces 603-1 to 603-5, the corresponding MPCM may couple with a counterpart MPCM of the inserted sled. This coupling may provide the inserted sled with connectivity to both signaling infrastructure and power infrastructure of the rack in which it is housed.

Figure 7:
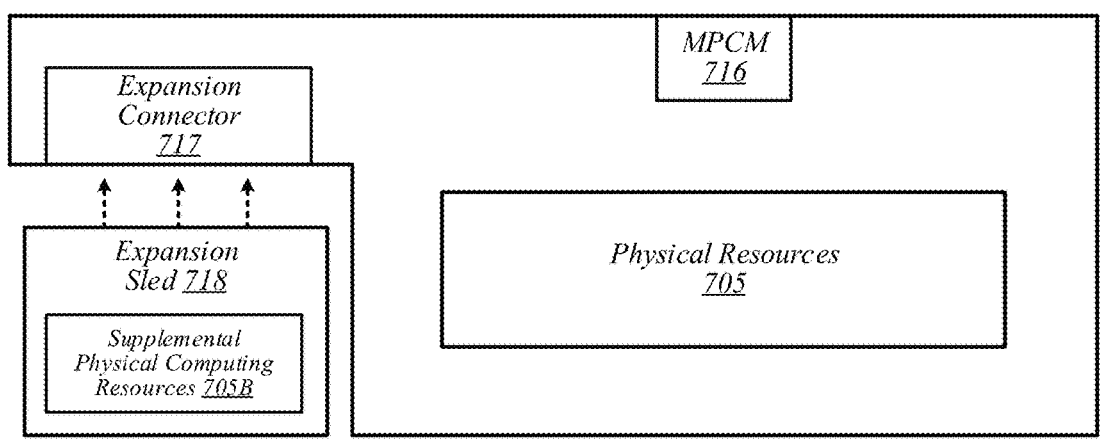
FIG. 7 illustrates an example of a sled.

Included among the types of sleds to be accommodated by rack architecture 600 may be one or more types of sleds that feature expansion capabilities. FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
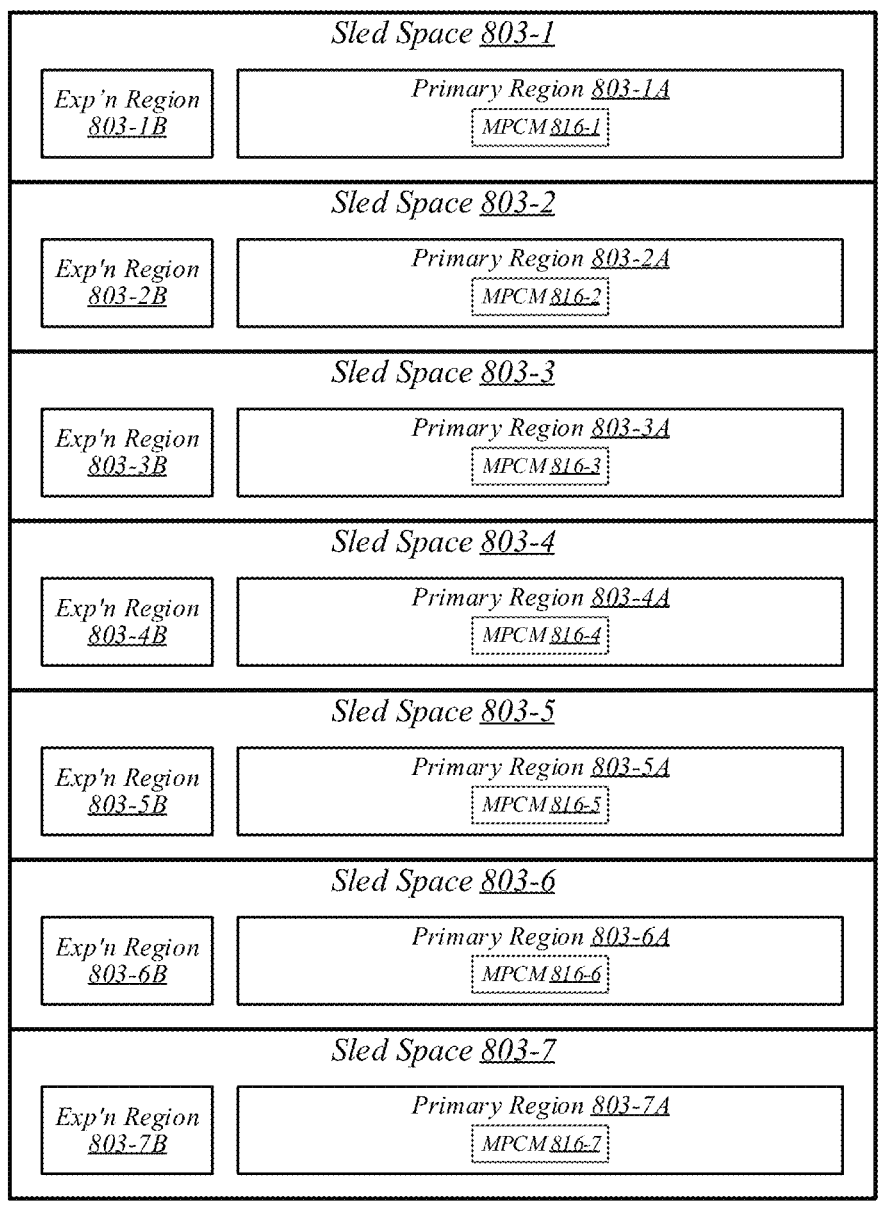
FIG. 8 illustrates an example of a data center.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
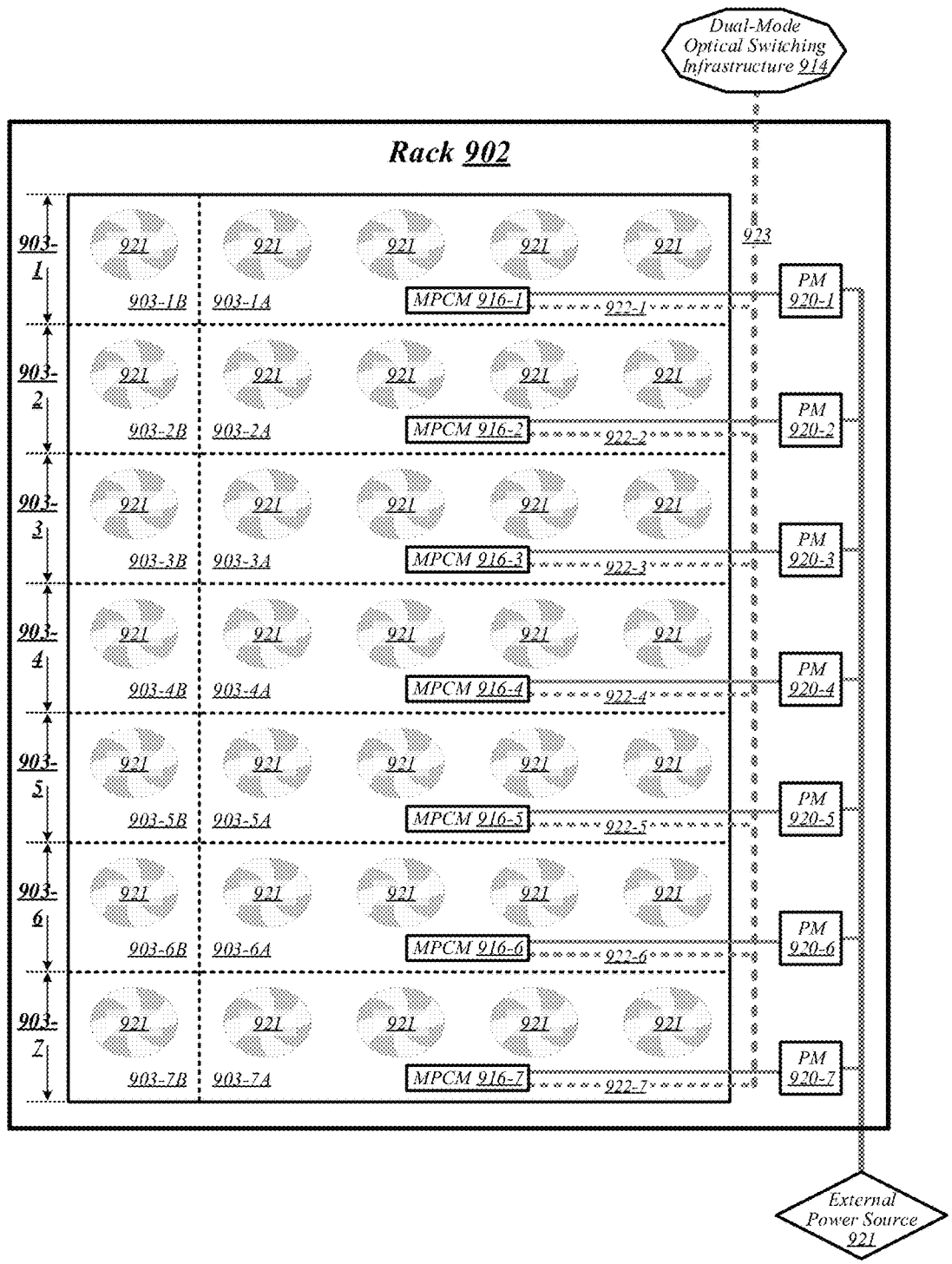
FIG. 9 illustrates an example of a data center.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1 U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
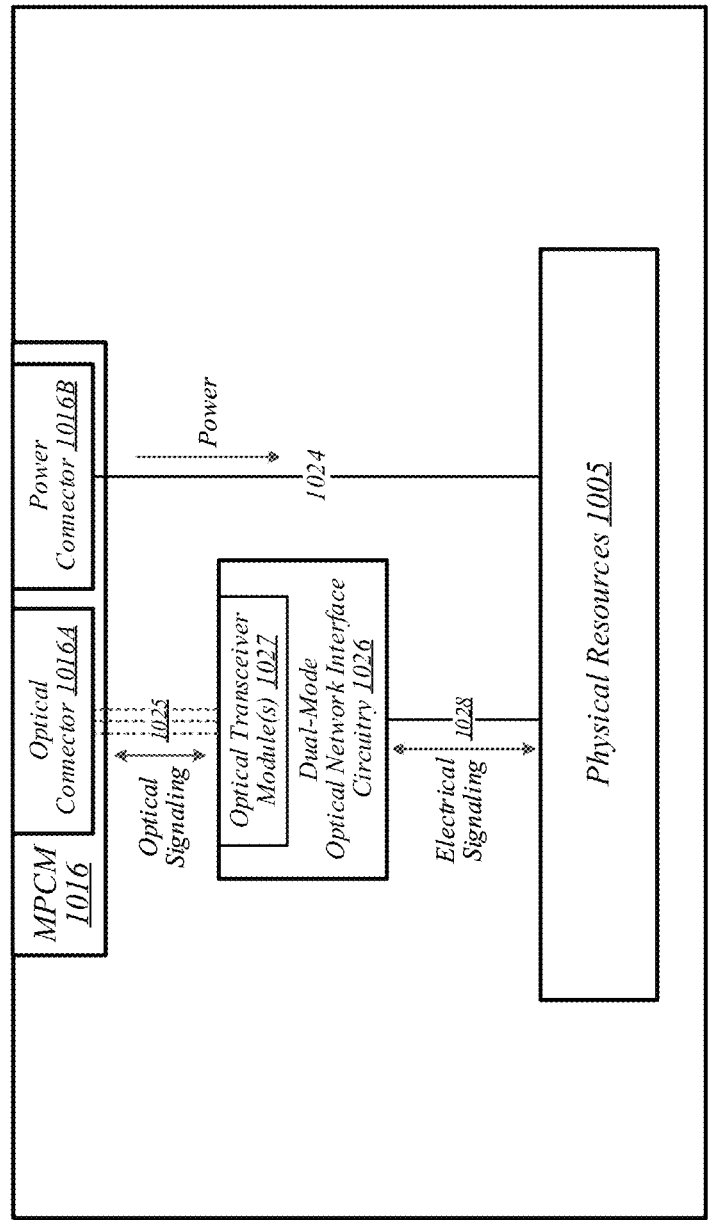
FIG. 10 illustrates an example of a sled.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
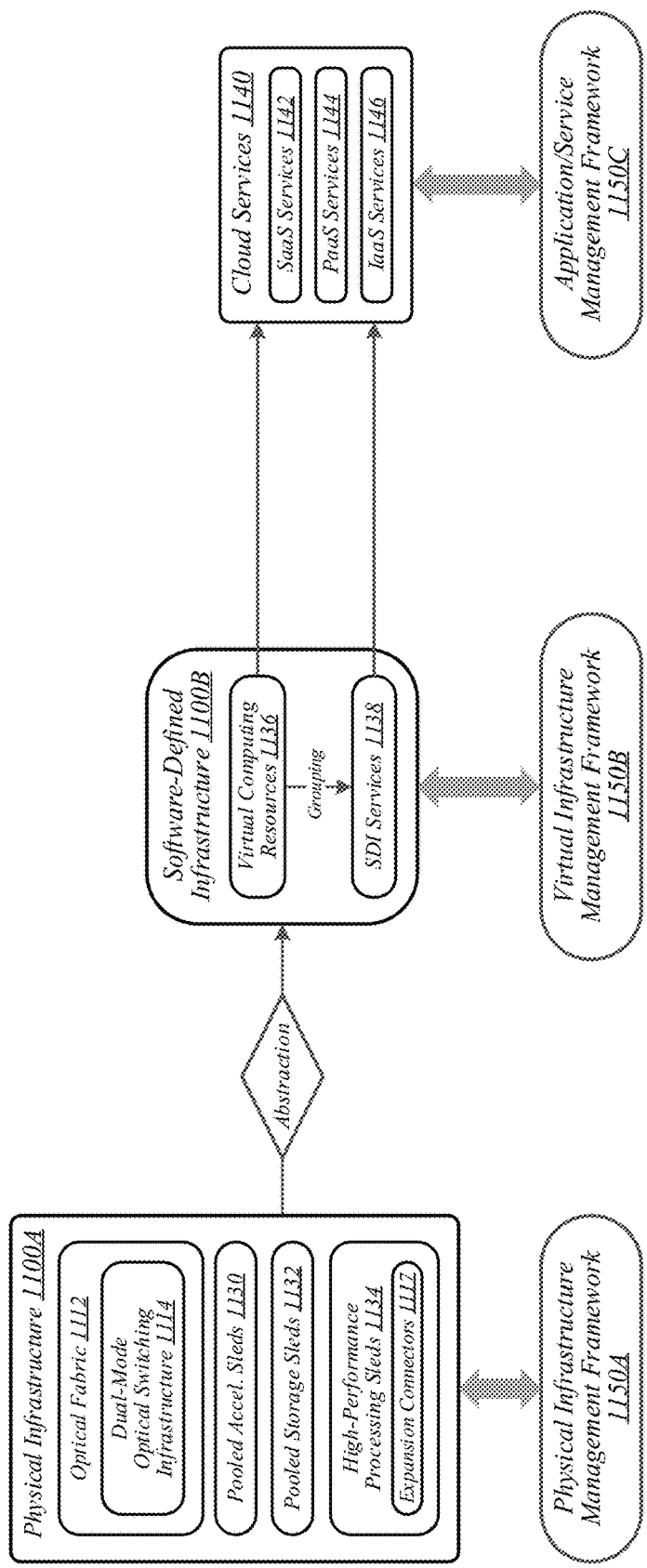
FIG. 11 illustrates an example of a data center.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is available globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
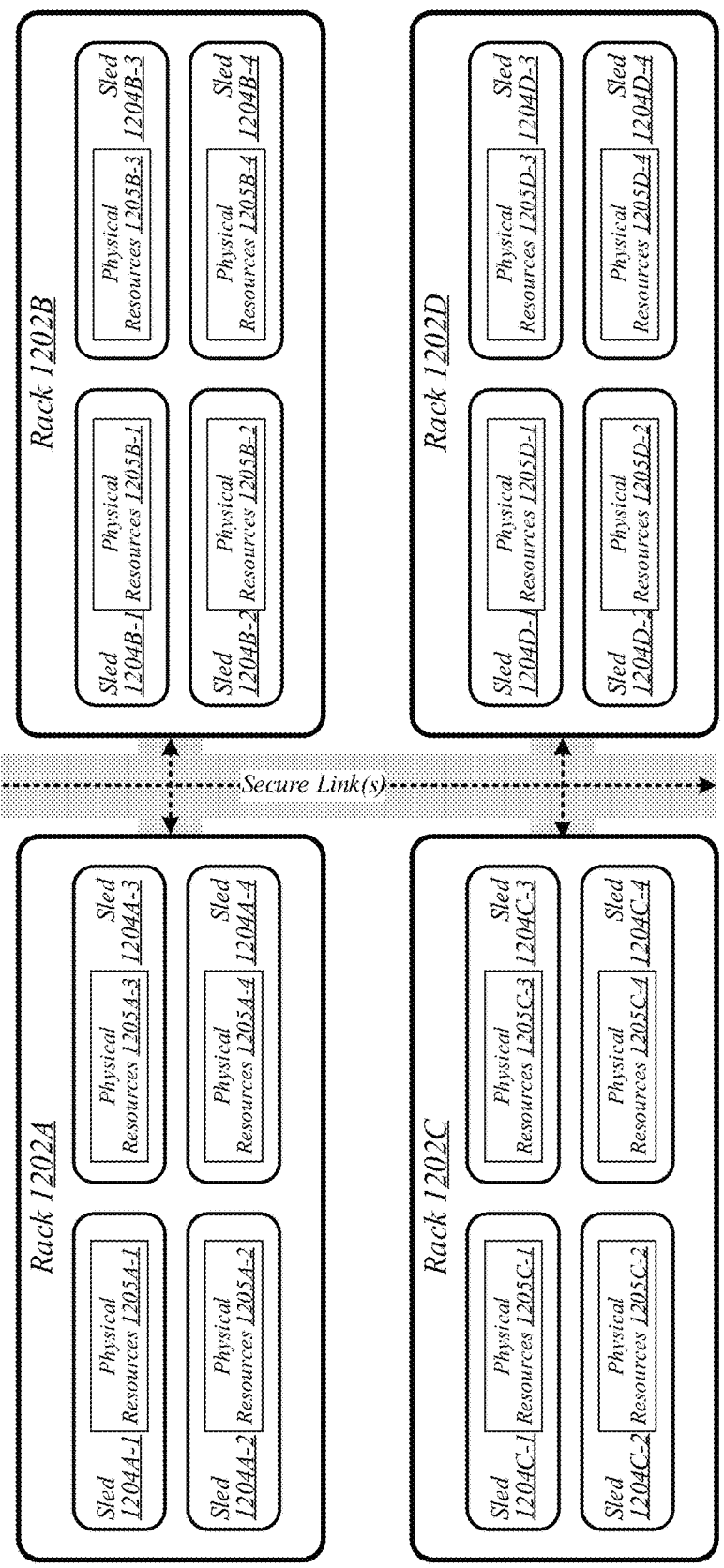
FIG. 12 illustrates an example of a data center.

FIG. 12 illustrates an example of a data center 1200 that may generally be representative of a data center or other type of computing network in/for which one or more techniques described herein may be implemented according to various embodiments. As shown in FIG. 12, the data center 1200 may be similar to and include features and components previously discussed. For example, the data center 1200 may generally contain a plurality of racks 1202A to 1202D, each of which may house computing equipment including a respective set of physical resources 1205A-x to 1205D-x, where x may be any positive integer from 1 to 4. The physical resources 1205 may be contained within a number of sleds 1204A through 1204D. As mentioned, the physical resources 1205 may include resources of multiple types, such as—for example—processors, co-processors, fully-programmable gate arrays (FPGAs), memory, accelerators, and storage. Moreover, the physical resources 1205 may be physical memory resources; physical compute resources, physical storage resources, physical accelerator resources, etc.

In embodiments, the physical resources 1205 may be pooled within racks and between racks and provided as a composed node to process workloads. For example, physical resources 1205A-1 of sled 1204A-1 may be pooled with physical resources 1205A-3 of sled 1204A-3 to provide combined processing capabilities for workloads across sleds within the same rack, e.g. rack 1202A. Similarly, physical resources 1205 of one or more racks may be combined with physical resources of one or more other racks to create a pool of physical resources to process a workload as a composed node. In one example, the physical resources 1205A-3 may be combined and pooled with physical resources of 1205B-1, which are located within rack 1202A and rack 1202B, respectively. Any combination of physical resources 1205 may be pooled together as a composed node to process workloads and embodiments are not limited in this manner. Moreover, some embodiments may include more or less physical resources 1205, sleds 1204, and racks 1202 and the illustrated example should not be construed in a limiting manner.

In the illustrated example of FIG. 12, the data center 1200 may provide verification and authentication capabilities for the physical resources 1205. The verification and authentication capabilities include determining that each of the physical resources 1205 are the original equipment manufacturer (OEM) components that are intended to be in a sled 1204 based on a sled manifest distributed with the sled 1204 and operating according to their intended function, for example. The sled manifest may include an identifier for the sled 1204, inventory (identifiers) of the physical resources 1205 of the sled 1204, hardware authentication information for each physical resource 1205 of a sled 1204, and software/firmware validation information for each of the physical resource 1205 of a sled 1204.

In embodiments, each of the sleds 1204 may perform verification and authentication operations using the sled manifest and generate results indicating success or failure of the operations. Each sled 1204 may provide the results and sled manifest to a pod management controller 1231 via one or more secure links. As will be discussed in more detail below, each sled 1204 may include a verification controller, to ensure that each physical resource 1205 is authenticated and is operating as intended based on hardware and software authentication and verification. Further, the verification controller may first verify the sled manifest. The verification controller may use and access a hash value of a sled manifest used as part of the results from a secure location. The verification controller may compare the hash value of the sled manifest stored in the secure location with a generated hash value sled manifest to verify the sled manifest. Once verified, the verification controller may authenticate and verify the physical resources 1205 and generate results. These results, which may include a hash value of the sled manifest used for authentication, may be signed by the verification controller using a private key and provided to the pod management controller 1231 through one or more secure links. The secure links may utilize one or more secure protocols, e.g. a transport layer security (TLS) protocol, a secure sockets layer (SSL) protocol, a private communications transport (PCT) protocol, and so forth.

The pod management controller 1231 may receive the results and sled manifest and validate them to ensure that the results are the actual results of the operations performed and the sled manifest is the actual sled manifest from an authentic sled 1204. In an example, the pod management controller 1231 may ensure the sled manifest received from the authenticated sled 1204 is authentic by utilizing a digital signature. The manufacturer of sled 1204 (or any other authorized party) may sign the sled manifest with a private key and the pod management controller 1231 may validate the digital signature using a public key that may be obtained from a trusted third party or from a public key certificate signed by a trusted CA.

The pod management controller 1231 may also verify the integrity of the sled manifest contents using a hash value. For example, the sled manifest signature may contain a hash value of the sled manifest. The pod management controller 1231 can itself calculate a hash value of the sled manifest and compare it to the hash value included with the signature. If the values match, the sled manifest has not been modified in any way from the time the signature was created. This hash value of the sled manifest can also be compared with the received hash value from the sled 1204, which is part of the results from the sled verification. If the values match, then the pod manager controller 1231 has an assurance that this same sled manifest was used for sled verification by the verification controller. Moreover, using hashing techniques may ensure that the sled manifest is not corrupted during communication to the pod management controller 1231.

Similarly, the pod management controller 1231 may authenticate the results of the operations performed on the sled 1204 utilizing a signature of a private key of a verification controller. The results may be signed by the verification controller. The pod management controller 1231 may authenticate that the results were generated by the verification controller using a public key, which may be obtained from the sled manifest and a trusted third party.

In some instances, the pod management controller 1231 may verify the integrity of the content of the results based on a signature. As similarly discussed above, a hash value of the results may be generated by the verification controller (or a sled) and may be included as part of the signature of those results. The pod management controller 1231 may generate its hash value of the received results and perform a comparison with the hash included in the signature of the results. If the hash values match the pod management controller 1231 can trust that the results are authentic (i.e., generated by a legitimate verification controller in the target sled).

The pod management controller 1231 may enable the physical resources 1205 of a sled 1204 to process a workload and data based on the outcome of the authentication and verification of the sled manifest and the results performed on the sled 1204. For example, if the sled manifest and the results are authenticated, and verified by the pod management controller 1231, the pod management controller 1231 may enable the physical resources of the sled to be used to compose a node. The pod management controller 1231 may add the inventory of the physical resources 1205 to a database used to generate a composed node, for example. However, the pod management controller 1231 may prevent physical resources 1205 from being utilized if at least one of the results and the sled manifest are not authenticated and verified.

Figure 13A:
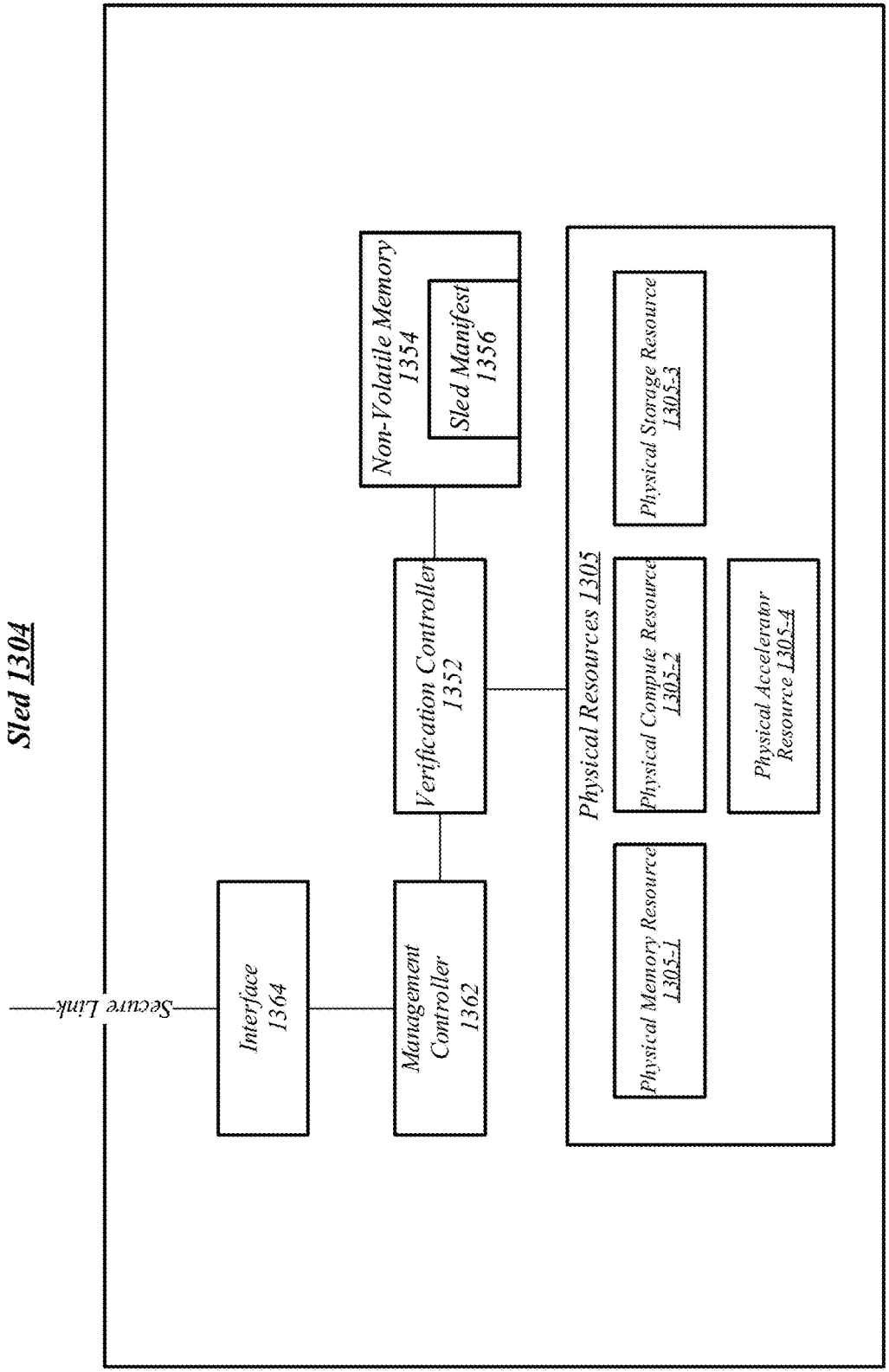
FIG. 13A illustrates an example of a sled.

FIG. 13A illustrates an example of a sled 1304 that may be representative of a sled designed for use in conjunction with the racks discussed herein, for example. In embodiments, sled 1304 may have similar components and functionality as sled 1004 discussed in FIG. 10. Sled 1304 may feature physical resources 1305 including physical memory resources 1305-1, physical compute resources 1305-2, physical storage resources 1305-3, and physical accelerator resources 1305-4. Moreover, these physical resources 1305 may be processors, co-processors, fully-programmable gate arrays (FPGAs), memory, accelerators, and storage. The sled 1304 may also include a non-volatile memory 1354 having a sled manifest 1356, a verification controller 1352, a management controller 1352, and an interface 1364 coupled with a secure link.

The non-volatile memory 1354 having the sled manifest 1356 may be a secure memory such that non-volatile memory 1354 cannot be changed or only be changed with an appropriate access (write) privileges. In embodiments, the non-volatile memory 1354 may be incorporated in or be part of a processing unit, such as a CPU and a trusted platform component such as an FPGA, CPLD, and an ASIC, or may be a separate non-volatile memory. The sled manifest 1356 may also be updated when valid and authenticate resources are used to replace other resources, e.g. due to a failure or performance upgrade.

In embodiments, the sled manifest 1356 may include information about the physical resources 1305 to ensure that they are authentic and operate as designed/intended. For example, the sled manifest 1356 may include hardware authentication information for each of the physical resources 1305 and software/firmware validation information for the physical resources 1305. The hardware authentication information may include a a public key that may be used to verify the physical resource 1305. As will be discussed in more detail below, the public key may be used to authenticate a signed nonce or certificate signed by the hardware of the physical resources 1305 using a secure private key. Similarly, the sled manifest 1356 may include public keys of the firmware/software associated with the physical resources 1305. In some instances, the sled manifest 1356 may include hash values previously generated based on the firmware/software that may be used to authenticate and validate the firmware and software. The sled manifest 1356 may also include other information such as identification information to uniquely identify the sled 1304, other identification information to identify each of the physical resources 1305, details about minimal firmware and security revisions, and datacenter rules and polices.

In embodiments, the verification controller 1352 of the sled 1304 may utilize the sled manifest 1356 to authenticate and verify the physical resources 1305. The verification controller 1352 may include secure circuitry and process one or more instructions stored in a secure memory, such as non-volatile memory, to validate/authenticate the sled manifest 1356 and the physical resources 1305. The one or more instructions may cause the verification controller 1352 to authenticate and verify the physical resources 1305 when a sled is first inserted in a rack, for example. The verification controller 1352 may also process one or more instructions to verify and authenticate the physical resources 1305 when a change occurs to a physical resource 1305, e.g. a resource is replaced.

In some embodiments, the verification controller 1352 may operate when the sled 1304 is first plugged/inserted into a rack and before other hardware/elements, e.g. when the management controller 1362 begins processing information and data. Moreover, the verification controller 1352 may authenticate and verify the physical resources 1305 before they are enabled and presented to a pod management controller as possible resources for use in composed nodes by the management controller 1362.

In embodiments, the verification controller 1352 may retrieve/receive the sled manifest 1356 from the non-volatile memory 1354 authenticate the sled manifest and perform the authentication and verification operations. To authenticate, the sled manifest 1356, the verification controller 1352 may compare a hash value originally generated by a manufacturer and stored in a secure location of non-volatile memory with a hash value the verification controller 1352 generates based on the sled manifest. The non-volatile memory storing the hash value of the sled manifest 1356 may be different or the same as non-volatile memory 1254. If the original hash value matches the generated hash value, the verification controller 1352 may verify the sled manifest 1356 and perform authentication nd verification operations using the sled manifest 1356.

In embodiments, the authentication and verification operations include the verification controller 1352 generating a nonce and sending the nonce to a physical resource 1305. The physical resource 1305 may sign the nonce with a private key which it stores securely and is provided by the manufacturer of the resource 1305, for example. The verification controller 1352 may receive the nonce signed with the private key of the physical resource 1305 from the physical resource 1305 and determine whether the physical resource 1305 is authentic. More specifically, the verification controller 1352 may use the public key based on a certificate in the sled manifest 1356 associated with the physical resource 1305 to authenticate the signed nonce from the physical resource 1305. The public key may be used to verify the signed nonce and if the verification succeeds the verification controller 1352 may authenticate the physical resource 1305. If it fails, the verification controller 1352 may indicate that the physical resource is not authenticated. The verification controller 1352 may authenticate each of the physical resources 1305 of the sled in this manner. Embodiments are not limited in this manner. The physical resources 1305 In some embodiments, the verification controller 1352 may utilize a cryptographic query using Intel's® Enhanced Privacy Identification (EPID).

The verification controller 1352 may also verify the firmware/software for each of the physical resources 1305. For example, the verification controller 1352 may receive a hash value generated based on the firmware/software from a physical resource 1305. In some instances, the hash value received from the physical resource 1305 may be generated based on a request from the verification controller 1352. The verification controller 1352 may compare the hash value received from the physical resource 1305 with a hash value stored in the sled manifest 1356. The stored hash value may have previously been generated based on the firmware/software, at the time of manufacturer, for example. If the hash values match, the verification controller 1352 may verify the firmware/software associated with the physical resource 1305. Alternatively, if the hash values do not match, the verification controller 1352 may not verify the firmware/software for the physical resource 1305. The verification controller 1352 may perform this operation for each of the physical resources having firmware/software.

In embodiments, the verification controller 1352 may perform authentication and verification operations for each of the physical resources 1305 of the sled 1304 and generate results of the operations. The results may indicate whether each of the authentication and verification of the physical resources 1305 was successful or not successful. In some embodiments, the verification controller 1352 may sign the results with a private key such that they may be authenticated by a pod management controller, as previously discussed. Once the verification controller 1352 has completed the authentication and verification operations, the sled 1304 may continue its initialization process, which may include one or more operations performed by the management controller 1362. The verification controller 1352 may also detect firmware corruption that may lead to malicious attacks trying to control of the platform. Once detected, the verification controller 1352 may recover verified firmware to prevent these types of attacks.

The management controller 1362, which may be a specialized microcontroller, such as a baseboard management controller or sled management controller, may be embedded in a motherboard of the sled 1304 to interface between system management software and platform hardware, e.g. physical resources 1305. Further, the management controller 1362 may also interface with other components of a data center, such as a pod management controller and a rack management controller. For example, the management controller 1362 may receive/retrieve the results of the authentication and verification operations performed by the verification controller 1352 and the sled manifest 156 to communicate to pod or rack management controller via the interface 1364.

The management controller 1362 may also establish a secure link with a rack management controller and a pod management controller to communicate information, such as the results and the sled manifest 1356, via the interface 1364. In embodiments, the management controller 1362 may establish the secure link with a pod management controller using one or more protocols, such as a transport layer security (TLS) protocol, a secure sockets layer (SSL) protocol, a private communications transport (PCT) protocol, and so forth. Once the secure link is established, the management controller 1362 may communicate the results which may be signed by the verification controller 1352 to a pod management controller via the interface 1364. The management controller 1262 may also send the sled manifest 1356, which may also have been signed by the manufacturer of the sled or an authorized third party, for example. As previously discussed, a pod management controller may receive the signed results and sled manifest 1356 and perform its authentication and verification before enabling the physical resources 1305 to be used in a composed node.

Figure 13B:
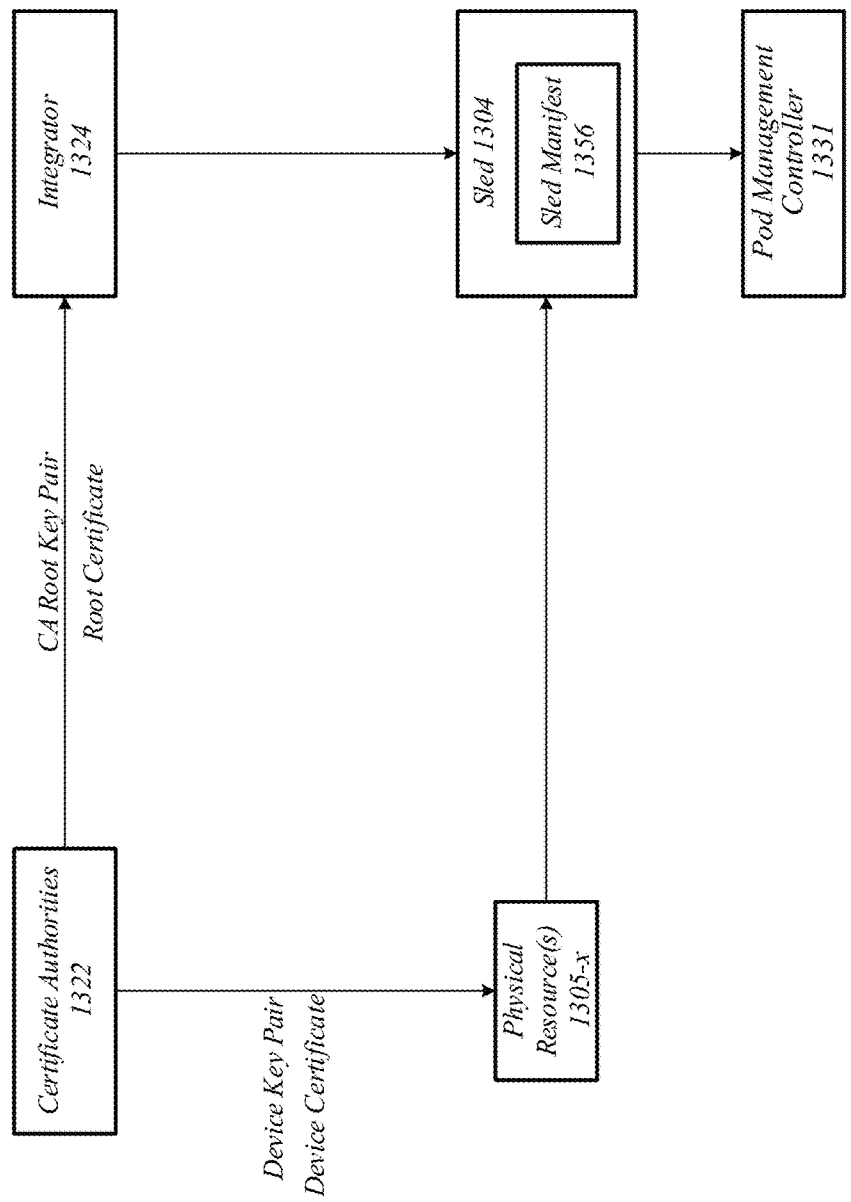
FIG. 13B illustrates an example of a distribution and attestation flow.

FIG. 13B illustrates an example of a distribution and attestation flow 1320 to ensure that devices, such as physical resources 1305 to detect counterfeit and improper devices. Embodiments include support for securely maintaining a unique private/public key pair and perform cryptographic functions (message signing), as previously discussed. Embodiments also include maintaining platform or sled support to maintain a set of root certificates and platform policies in a manifest, such as a sled manifest 1356.

These features may be provided by one or more certificate authorities 1322 for devices and resources, such as a device vendor or OEM, and an integrator 1234 to integrate physical resources 1305 into a platform or sled 1304 to provide storage and processing capabilities. Embodiments are not limited in this manner, and other trusted entities may be involved to enable sure and authenticate resources.

In embodiments, the certificate authorities 1322 may generate and maintain a root key pair and root certificate for their devices or physical resources 1305, which may be provided to the integrator 1324. Each certificate authority 1322 or vendor may maintain and provide their own unique root key pair and root certificate for the resources they manufacture and are implemented in a platform or sled 1304, for example. The integrator 1324 may collect all of the root key pairs and root certificates for resources 1305 to be implemented in a sled 1304, for example. The integrator 1324 may generate the sled manifest 1356 based on these root key pairs and root certificates. The root key pairs and root certificates may include the public keys used to verify and authenticate the signed nonce(s) received by the physical resources 1305, as previously discussed. The sled manifest 1356 may also be signed by the integrator 1324 and provisioned secure non-volatile memory, such as non-volatile memory 1354, or in trusted component, such as a trusted platform module, a platform resilience technology device, and so forth. The integrator 1324 may also provision a unique platform key pair in the secure non-volatile memory or trusted component.

The certificate authorities 1322 or vendors may also manufacture devices and generate unique per device private/public key pairs and device certificates signed by the root private key. The certificate authorities 1322 may provision a physical resource 1305, securely, with the private/public key pair (device key pair). For example, the physical resource 1305 may maintain the device key pair in a secure, non-volatile memory, hardware fuses, and so forth. A device certificate associated with a physical resource 1305 may also be provisioned with the physical resource 1305. The physical resources 1305 including the device key pair and the device certificate may be provided to the integrator 1324 to be implemented in a sled 1304.

In embodiments, a sled 1304 may utilize the sled manifest 1356 to authenticate and validate each of its' physical resources 1305 during a boot or reboot cycle, as previously mentioned. For example, a sled 1304 including circuitry, such as the verification controller 1352 or the like, may retrieve the sled manifest 1356 and may verify the sled manifest's signature. Moreover, verification controller 1352 may discover all of the physical resources 1305 attached and coupled to the sled 1304. The verification controller 1352 may retrieve the device certificates for each of the physical resources 1305, for example. The verification controller 1352 may verify the device certificates utilizing the associated root keys and root certificates.

In embodiments, the verification controller 1352 generates a random nonce for every physical resource 1305 and sends the nonce and a request for device details (hardware stepping, version, firmware revision, firmware measurement, etc.) to each of the physical resources 1305. The physical resources 1305 may collect the requested details and attaches the random nonce. Each of physical resources 1305 may sign the response, including the requested details and nonce, with the physical resources 1305 device private key and sends the response to the verification controller 1352. The verification controller 1352 receives the response confirms the random nonce, verifies the signature using the public key, and performs a compliance check against policies store in the sled manifest 1356. The platform policies stored in the sled manifest 1356 may control the sled's actions to non-compliant devices, e.g. physical resources 1305 that failed verification, physical resources 1305 that were verified, but have a deficient firmware version, etc. The sled 1304 may take an action, such as reporting on the physical resources 1305, disabling the link between the sled 1304 and the physical resource 1305, disable the physical resource 1305 itself, preventing the sled 1304 from completing its boot cycle, and preventing the physical resource 1305 to be used as part of a composed node, for example. The sled 1304 may send the results and the sled manifest to a datacenter management entity, such as a pod management controller 1331, as discussed herein.

Figure 14:
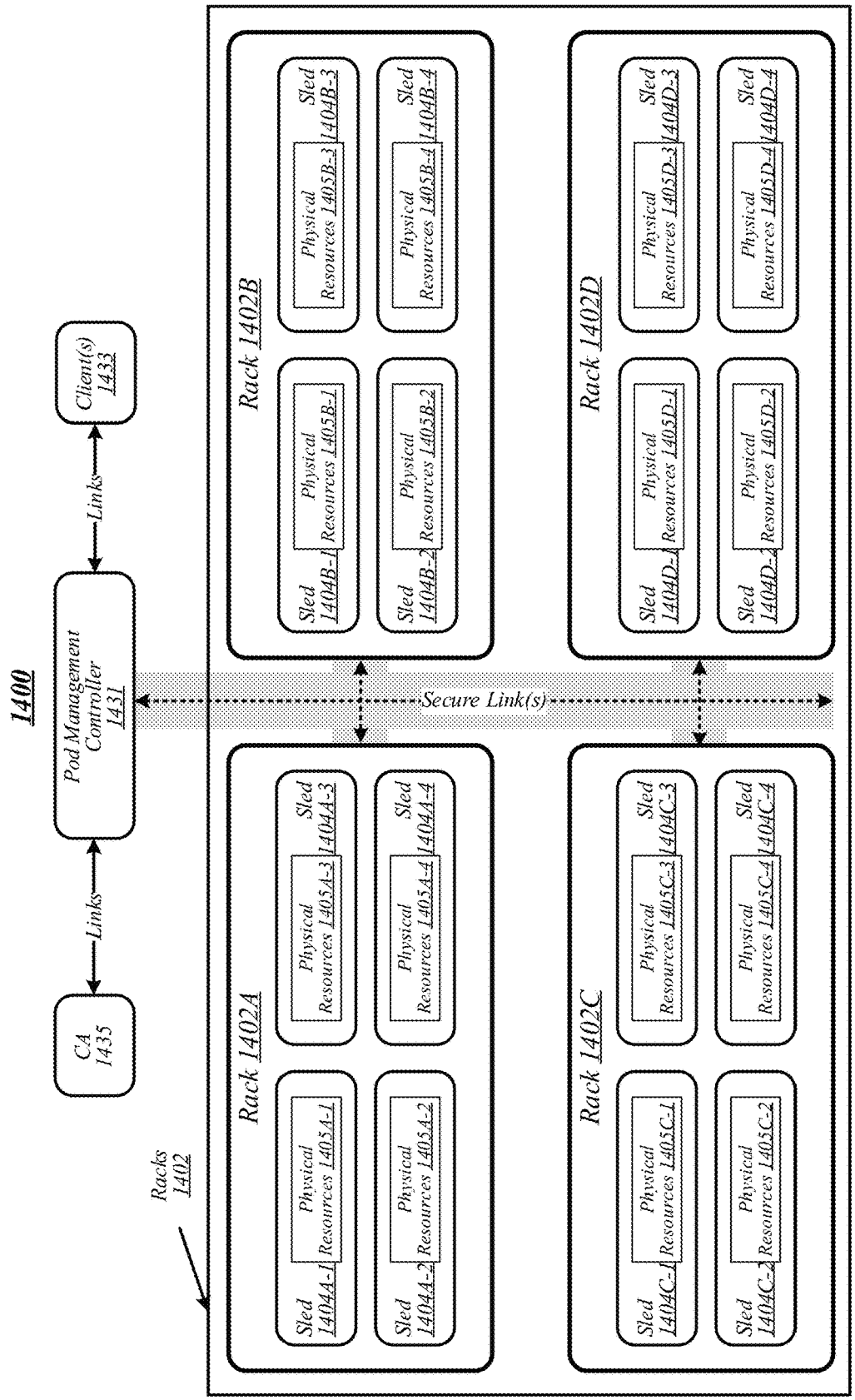
FIG. 14 illustrates an example of a data center.

FIG. 14 illustrates another example of a data center 1400 that may be representative of a data center or other type of computing network in/for which one or more techniques described herein may be implemented according to various embodiments. As shown in FIG. 14, the data center 1400 may be similar to and include features and components previously discussed. For example, the data center 1400 may generally contain elements and component similar as those discussed in FIG. 12.

In embodiments, the physical resources 1405 may be pooled within racks and between racks and provided as a composed node to process workloads. In embodiments, the pod management controller 1431 may determine physical resources 1405 that are available to generate composed nodes based on whether they are authenticated and verified as previously discussed. For example, the pod management controller 1431 may authenticate each of the results and the sled manifest using public keys that it may have received from a trusted third party or an OEM. The pod management controller 1431 may use the public key associated with a private key used to sign the results to authenticate the results. Similarly, the pod management controller 1431 may use a public key associated with a private key used to sign the sled manifest to authenticate the sled manifest.

The pod management controller 1431 may also validate the results and the sled manifest using hash values. For example, the pod management controller 1431 may receive a hash value for the results from a sled 1404, generate a hash value for the results and compare the received hash value and the generated hash value to determine whether they match. If they match, the pod management controller 1431 may determine that the content of the results have not been corrupted or changed.

Pod management controller 1431 may receive a hash value as part of the signature and with the sled manifest. The pod management controller 1431 may generate a hash value of the sled manifest, compare the hash value in the manifest signature with the generated hash value to determine whether they match or not. If they match, the pod management controller 1431 may determine that the sled manifest has not changed or been corrupted. Embodiments are not limited in this manner.

The pod management controller 1431 may enable the physical resources 1405 that are successfully authenticated and validated by the sled 1404 and confirmed by the pod management controller 1431 to be used in a composed node, e.g. a clustering of physical resources to process a workload based on various requirements. Thus, the pod management controller 1431 ensures that the physical resources 1405 for use as a composed node is an OEM provided resource and is operating according to its intended function.

In embodiments, the pod management controller 1431 may generate a composed node based on one or more requirements stipulated by a user or client 1433 to process a workload. These requirements may include performance requirements, e.g. processing requirements, memory requirements, network requirements, and so forth. Other requirements may also be stipulated. For example, a user or client 1433 may specify that a workload is processed via manufacturer(s) of the physical resource 1405. For example, a user may require that a workload is processed on Intel® Corp. processing devices. Thus, the pod management controller 1431 may use these requirements to generate one or more composed nodes to process the workload. A composed node may include one or more physical resources that may or may not be within the same sled 1404 and rack 1402. As previously discussed, a composed node may include physical resources 1405 within the same rack 1402 and from different racks 1402.

The pod management controller 1431 may also generate a platform certificate request to have a platform certificate generated and signed for a composed node by the certificate authority 1435. The platform certificate may include information from each of the sleds manifests associated with physical resources used to generate a composed node. Moreover, the platform certificate may include a listing of the physical resources that make up the composed node, for example.

The certificate authority 1435 may receive the platform certificate request and generate the platform certificate. The certificate authority 1435 may sign the platform certificate with a private key, which may be used to authenticate the platform certificate. The platform certificate may be communicated to the pod management controller 1431 and the sleds 1404 having the physical resources 1405 used in the composed node. In some instances, a client 1433 may request the platform certificate from a data center to ensure that the physical resources 1405 meet the requirements to process a workload. The pod management controller 1431 may send the signed platform certificate to a client 1433. In embodiments, the client 1433 may authenticate the platform certificate using a public key of the certificate authority 1435, for example.

Figure 15:
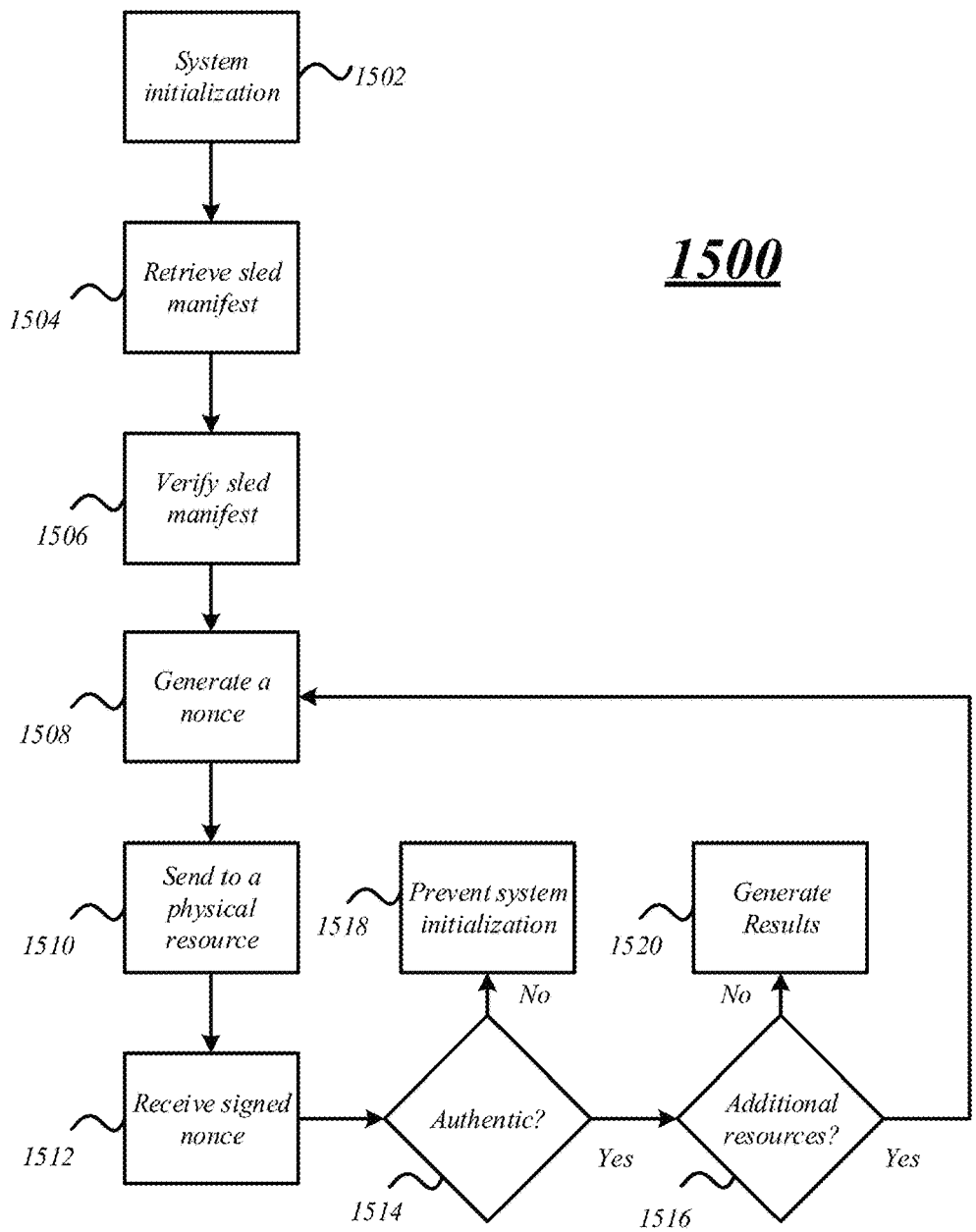
FIG. 15 illustrates an example of a first logic flow.

FIG. 15 illustrates an embodiment of logic flow 1500. The logic flow 1500 may be representative of some or all the operations executed by one or more embodiments described herein. For example, the logic flow 1500 may illustrate operations performed by a verification controller to authenticate and verify physical resources of a sled. However, embodiments are not limited in this, and one or more operations may be performed by other components or systems discussed herein.

At block 1502, the logic flow 1500 includes detecting a system initialization. The system initialization may be generated when a sled is plugged or inserted into a sled slot of a rack. As part of the system initialization, power may be applied to various elements of a sled including a management controller, a verification controller, non-volatile memory, and physical resources. In embodiments, the verification controller may authenticate and verify the physical resources of a system before the system completely initializes. If one or more of the physical resources cannot be authenticated or validated, the verification controller may prevent a sled from completing the initialization process.

At block 1504, the logic flow 1500 include retrieve (or receiving) a sled manifest from a non-volatile (secure) memory. The sled manifest includes identification, authentication, and verification information for a sled and the physical resources of the sled. At block 1506, the sled manifest may be verified to ensure the integrity of the sled manifest and its contents. For example, a verification controller may calculate a hash value based on the sled manifest and compare it with a previously generated and verified hash value stored in a secure location or hardware. In some instances, the verified hash value may have been generated by a manufacturer of the sled at the time of manufacturer or when a change is made to the sled. Embodiments are not limited to this example, and in some instances, the verified hash value may be generated when a change occurs on the sled, for example.

At block 1508, the logic flow 1500 includes generating a nonce, which may be a randomly generated number used once to authenticate a physical resource. Each physical resource may be authenticated with a different nonce, for example. At block 1510, the verification controller may send the nonce to a physical resource. The physical resource may store a private key in a secure hardware location to sign the nonce Further, and at block 1512, the verification controller may receive the signed nonce from the physical resource. The verification controller may authenticate and verify the physical resource using a public key in the sled manifest. More specifically, the verification controller may determine whether the nonce communicated to the physical resource is the same as the signed nonce received from the physical resource. If they match, the verification controller may authenticate the physical resource at block 1514. If the physical resource is not successfully authenticated, the verification controller may prevent a sled from completing its initialization process at block 1518.

If a physical resource is successfully authenticated, the verification controller may determine whether additional physical resources exist to authenticate at decision block 1516. If no additional physical resources exist, the verification may generate results that may be sent to a pod management controller at block 1520. The results may indicate each of the physical resources and an indication as to whether they were authenticated or not authenticated. In some embodiments, the verification controller may sign the results with a private key that it stores in a secure hardware location. If additional physical resources exist, the logic flow 1500 may repeat to authenticate each of the physical resources.

Figure 16:
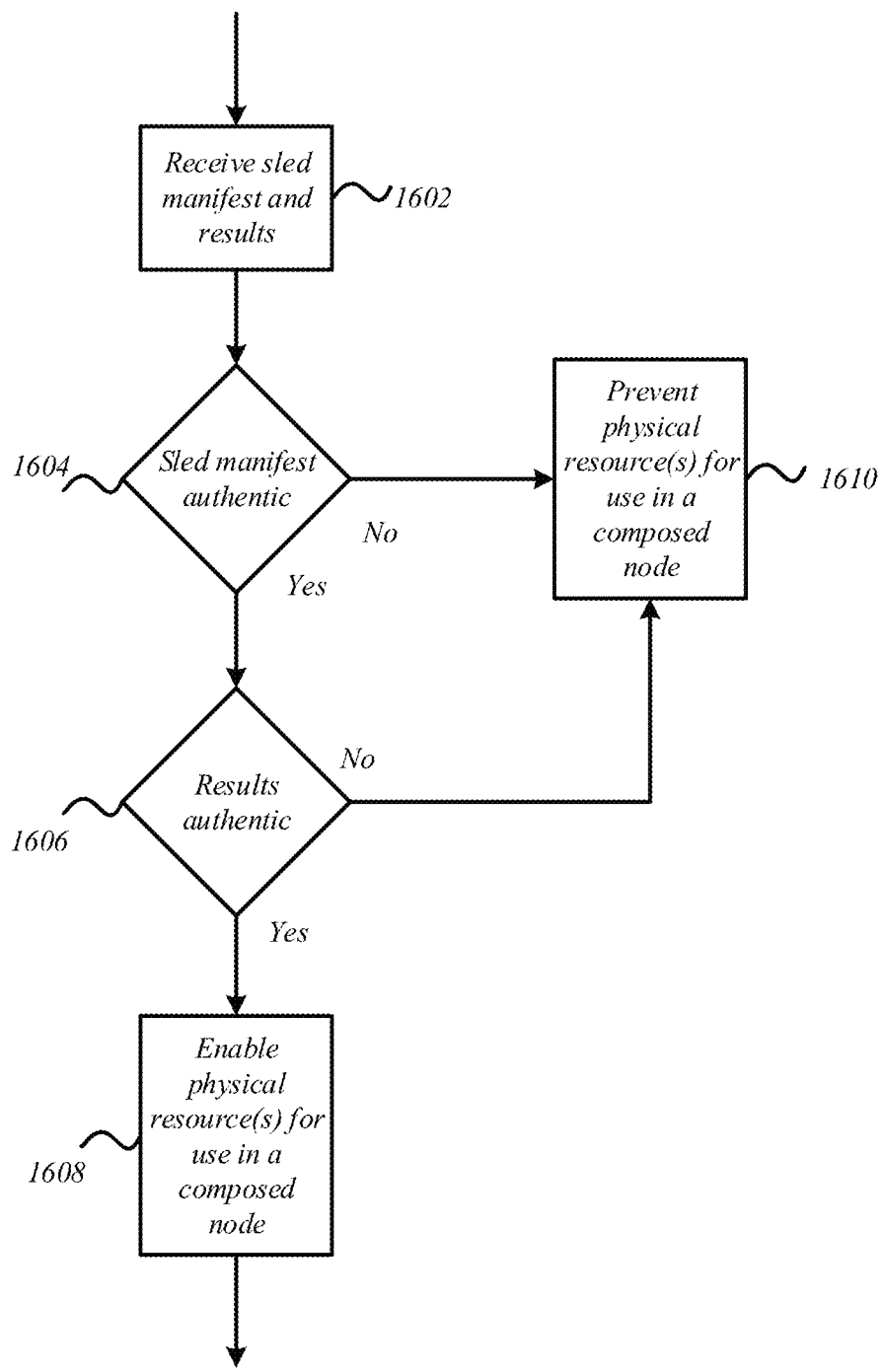
FIG. 16 illustrates an example of a second logic flow.

FIG. 16 illustrates an embodiment of logic flow 1600. The logic flow 1600 may be representative of some or all the operations executed by one or more embodiments described herein. For example, the logic flow 1600 may illustrate operations performed a pod management controller to authenticate an verify results and a sled manifest. However, embodiments are not limited in this, and one or more operations may be performed by other components or systems discussed herein.

At block 1602, the logic flow 1600 includes receiving a sled manifest and results of an authentication and validation operations from a sled. The sled manifest may include information to identify the physical resources of the sled and used to authenticate/validate the physical resources. The results may be generated by a verification controller, as previously discussed, and include whether the authentication and the verification of the physical resources were successful or not successful. The results also include a hash value of the sled manifest. Note that in embodiments the results and the sled manifest may not be communicated in the same communication, but may be communicated in different communications in one or more frames, for example. Embodiments are not limited in this manner.

At block 1604, the logic flow 1600 may include authenticating and validating the sled manifest received from a sled. More specifically, the pod management controller may authenticate the sled manifest using a public key corresponding to a private key used to sign the sled manifest by the sled, e.g. from a manufacturer or trusted third party. In some embodiments, the signature used to sign the sled manifest may include a hash value of the sled manifest. The pod management controller may validate the sled manifest via comparing the hash value in the signature with a hash value generated by the pod management controller. If the hash values match, the sled manifest may be authenticated. However, if they do not match, the physical resources associated with the sled manifest may be prevented from be used in a composed node at block 1610.

At block 1606, the logic flow 1600 includes determining whether the results are authentic and are generated by the appropriate verification controller. For example, the pod management controller may authenticate the results via a private/public key combination. More specifically, the pod management controller may authenticate the results with a public key in the manifest and may be associated with a private key of a verification controller. If the results are successfully verified with the public key, they are authenticated.

The pod management controller may also validate the results using hash values. The pod management controller may generate a hash value based on the results and compare the hash value with a hash that is included in the signature of the results. If the hash values match, the pod management controller may validate that the results have not been changed.

The pod management controller may use the authenticated and validated results to ensure that the authentication and validation operations performed on the sled were successful. If the results cannot be authenticated, validated, or do not indicate the physical resources were successfully authenticated/validated, the pod management controller may not permit the physical resources of the sled to be used in composed nodes at block 1610.

If the pod management controller cannot authenticate or validate the sled manifest, the pod management controller may not permit the physical resources of the sled to be used in composed nodes at block 1610. If the pod management controller can authenticate and validate the sled manifest, the pod management controller may enable the physical resources to be used as part a composed node. The pod management controller may add the physical resources to a database used to generate composed nodes, for example.

Figure 17:
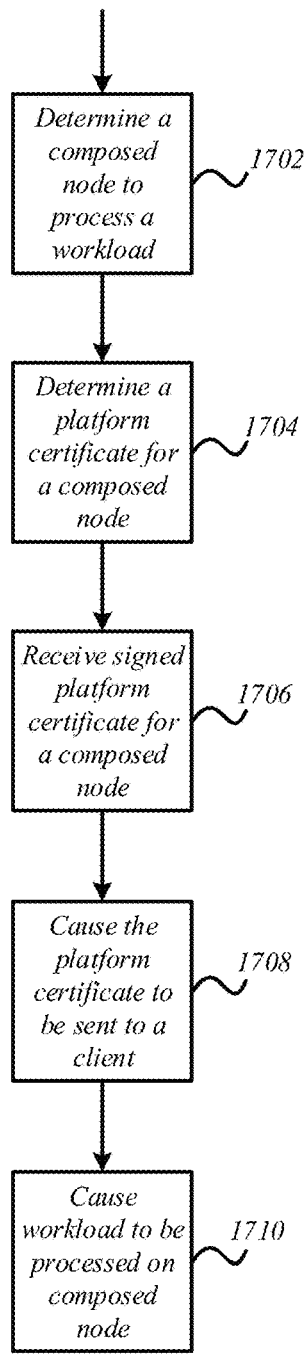
FIG. 17 illustrate a second example of a third logic flow.

FIG. 17 illustrates an embodiment of logic flow 1700. The logic flow 1700 may be representative of some or all the operations executed by one or more embodiments described herein. For example, the logic flow 1700 may illustrate operations performed a pod management controller. However, embodiments are not limited in this, and one or more operations may be performed by other components or systems discussed herein.

At block 1702, the logic flow 1700 may include determining a composed node to process a workload. The composed node may include one or more physical resources to process the workload. In some embodiments, the pod management controller may generate the composed node based on requirements for the workload, as previously discussed.

At block 1704, the logic flow 1700 includes determining a platform certificate for the composed node. The platform certificate may be a listing of the physical resources used to generate the composed node. In some embodiments, the pod management controller may send a platform certificate request to a certificate authority to sign the platform certificate.

At block 1706, embodiments include receiving the signed platform certificate from a certificate authority. Further and at block 1708 embodiments including causing the platform certificate to be sent to a client. In other instances, the pod management controller may receive the signed platform certificate from the certificate authority and send it to the client, for example. At block 1710, the logic flow includes causing the workload to be processed by the composed node.

The detailed disclosure now turns to providing examples that pertain to further embodiments. Examples one through thirty provided below are intended to be exemplary and non-limiting.

In a first example, a system, a device, an apparatus, and so forth may include a memory; and a pod management controller coupled to the memory. The pod management controller may determine whether a sled manifest and results are authentic and valid, the results generated by an authentication and validation operation performed to authenticate and validate physical resources of a sled, determine whether the results of the authentication and validation operation indicate the physical resources are authentic and valid. The pod management controller may permit the physical resources to process a workload in response to a determination that the sled manifest and results are authentic and valid, and the results indicate the physical resources are authentic and valid and prevent the physical resources from processing the workload in response to a determination that at least one of the sled manifest is not authentic and valid, the results are not authentic and valid, and the results indicate the physical resources are not authentic and valid.

In a second example and in furtherance of the first example, a system, a device, an apparatus, and so forth including the pod management controller to receive the sled manifest comprising identifiers for the physical resources from the sled, and receive the results of the authentication and validation operation performed to authenticate and validate the physical resources from the sled.

In a third example and in furtherance of any previous example, a system, a device, an apparatus, and so forth including the pod management controller to authenticate the sled manifest using a public key, the public key obtained from an original manufacturer of the sled or a trusted third party.

In a fourth example and in furtherance of any previous example, a system, a device, an apparatus, and so forth including the pod management controller to generate a hash value based on the sled manifest, compare the hash value with another hash value communicated with the results, validate the sled manifest if the hash value and the another hash value match, and invalidate the sled manifest if the hash value and the another hash value do not match.

In a fifth example and in furtherance of any previous example, a system, a device, an apparatus, and so forth including the pod management controller to authenticate the results using a public key, the public key obtained from the sled manifest.

In a sixth example and in furtherance of any previous example, a system, a device, an apparatus, and so forth including the pod management controller to add an indication of the physical resources in a database to permit the physical resources to process the workload.

In a seventh example and in furtherance of any previous example, a system, a device, an apparatus, and so forth including the pod management controller to receive the sled manifest and the results of the authentication and verification operations via a secure link with the sled.

In an eighth example and in furtherance of any previous example, a system, a device, an apparatus, and so forth including the pod management controller to generate a composed node comprising at least one of the physical resources of the sled.

In a ninth example and in furtherance of any previous example, a system, a device, an apparatus, and so forth including the pod management controller to send a platform certificate request to generate a platform certificate for the composed node to a certificate authority, the platform certificate to identify physical resources including the at least one of the physical resources used for the composed node, and receive a signed platform certificate.

In a tenth example and in furtherance of any previous example, a system, a device, an apparatus, and so forth including the pod management controller to send the signed platform certificate for the composed node to a client device.

In an eleventh example and in furtherance of any previous example, a non-transitory computer-readable storage medium, comprising a plurality of instructions, that when executed, enable processing circuitry to determine whether a sled manifest and results are authentic and valid, the results generated by an authentication and validation operation performed to authenticate and validate physical resources of a sled, determine whether the results of the authentication and validation operation indicate the physical resources are authentic and valid, permit the physical resources to process a workload in response to a determination that the sled manifest and results are authentic and valid, and the results indicate the physical resources are authentic and valid, and prevent the physical resources from processing the workload in response to a determination that at least one of the sled manifest is not authentic and valid, the results are not authentic and valid, and the results indicate the physical resources are not authentic and valid.

In a twelfth example and in furtherance of any previous example, a non-transitory computer-readable storage medium, comprising a plurality of instructions, that when executed, enable processing circuitry to receive the sled manifest comprising identifiers for the physical resources from the sled, and receive the results of the authentication and validation operation performed to authenticate and validate the physical resources from the sled.

In a thirteenth example and in furtherance of any previous example, a non-transitory computer-readable storage medium, comprising a plurality of instructions, that when executed, enable processing circuitry to authenticate the sled manifest using a public key, the public key obtained from an original manufacturer of the sled or a trusted third party.

In a fourteenth example and in furtherance of any previous example, a non-transitory computer-readable storage medium, comprising a plurality of instructions, that when executed, enable processing circuitry to generate a hash value based on the sled manifest, compare the hash value with another hash value communicated with the results, validate the sled manifest if the hash value and the another hash value match, and invalidate the sled manifest if the hash value and the another hash value do not match.

In a fifteenth example and in furtherance of any previous example, a non-transitory computer-readable storage medium, comprising a plurality of instructions, that when executed, enable processing circuitry to authenticate the results using a public key, the public key obtained from the sled manifest.

In a sixteenth example and in furtherance of any previous example, a non-transitory computer-readable storage medium, comprising a plurality of instructions, that when executed, enable processing circuitry to add an indication of the physical resources in a database to permit the physical resources to process the workload.

In a seventeenth example and in furtherance of any previous example, a non-transitory computer-readable storage medium, comprising a plurality of instructions, that when executed, enable processing circuitry to receive the sled manifest and the results of the authentication and verification operations via a secure link with the sled.

In an eighteenth example and in furtherance of any previous example, a non-transitory computer-readable storage medium, comprising a plurality of instructions, that when executed, enable processing circuitry to generate a composed node comprising at least one of the physical resources of the sled.

In a nineteenth example and in furtherance of any previous example, a non-transitory computer-readable storage medium, comprising a plurality of instructions, that when executed, enable processing circuitry to send a platform certificate request to generate a platform certificate for the composed node to a certificate authority, the platform certificate to identify physical resources including the at least one of the physical resources used for the composed node, and receive a signed platform certificate.

In a twentieth example and in furtherance of any previous example, a non-transitory computer-readable storage medium, comprising a plurality of instructions, that when executed, enable processing circuitry to send the signed platform certificate for the composed node to a client device.

In a twenty-first example and in furtherance of any previous example, a computer-implemented method may include determining whether a sled manifest and results are authentic and valid, the results generated by an authentication and validation operation performed to authenticate and validate physical resources of a sled, determining whether the results of the authentication and validation operation indicate the physical resources are authentic and valid, permitting the physical resources to process a workload in response to a determination that the sled manifest and results are authentic and valid, and the results indicate the physical resources are authentic and valid, and preventing the physical resources from processing the workload in response to a determination that at least one of the sled manifest is not authentic and valid, the results are not authentic and valid, and the results indicate the physical resources are not authentic and valid.

In a twenty-second example and in furtherance of any previous example, a computer-implemented method may include receiving the sled manifest comprising identifiers for the physical resources from the sled, and receiving the results of the authentication and validation operation performed to authenticate and validate the physical resources from the sled.

In a twenty-third example and in furtherance of any previous example, a computer-implemented method may include authenticating the sled manifest using a public key, the public key obtained from an original manufacturer of the sled or a trusted third party.

In a twenty-fourth example and in furtherance of any previous example, a computer-implemented method may include generating a hash value based on the sled manifest, comparing the hash value with another hash value communicated with the results, validating the sled manifest if the hash value and the another hash value match, and invalidating the sled manifest if the hash value and the another hash value do not match.

In a twenty-fifth example and in furtherance of any previous example, a computer-implemented method may include authenticating the results using a public key, the public key obtained from the sled manifest.

In a twenty-sixth example and in furtherance of any previous example, a computer-implemented method may include adding an indication of the physical resources in a database to permit the physical resources to process the workload.

In a twenty-seventh example and in furtherance of any previous example, a computer-implemented method may include receiving the sled manifest and the results of the authentication and verification operations via a secure link with the sled.

In a twenty-eighth example and in furtherance of any previous example, a computer-implemented method may include generating a composed node comprising at least one of the physical resources of the sled.

In a twenty-ninth example and in furtherance of any previous example, a computer-implemented method may include sending a platform certificate request to generate a platform certificate for the composed node to a certificate authority, the platform certificate to identify physical resources including the at least one of the physical resources used for the composed node, and receiving a signed platform certificate.

In a thirtieth example and in furtherance of any previous example, a computer-implemented method may include sending the signed platform certificate for the composed node to a client device.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. Also, in the preceding Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are at this moment incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a processor; and
   memory comprising instructions for a pod management controller that when executed by the processor cause the processor to:
   determine whether a sled manifest and results are authentic and valid, the results generated by an authentication and validation operation performed to authenticate and validate physical resources of a sled, the authentication and validation operation to generate a nonce, communicate the nonce to at least one of the physical resources of the sled, and authenticate a signed version of the nonce received from the at least one physical resource in response;
   determine whether the results of the authentication and validation operation indicate the physical resources are authentic and valid;
   permit the physical resources to process a workload in response to a determination that the sled manifest and results are authentic and valid, and the results indicate the physical resources are authentic and valid; and
   prevent the physical resources from processing the workload in response to a determination that at least one of the sled manifest is not authentic and valid, the results are not authentic and valid, and the results indicate the physical resources are not authentic and valid.

2. The apparatus of claim 1, the memory comprising instructions for the pod management controller that when executed by the processor cause the processor to:
   receive the sled manifest comprising identifiers for the physical resources from the sled; and
   receive the results of the authentication and validation operation performed to authenticate and validate the physical resources from the sled.

3. The apparatus of claim 1, the memory comprising instructions for the pod management controller that when executed by the processor cause the processor to authenticate the sled manifest using a public key, the public key obtained from an original manufacturer of the sled or a trusted third party.

4. The apparatus of claim 1, the memory comprising instructions for the pod management controller that when executed by the processor cause the processor to:
   generate a hash value based on the sled manifest;
   compare the hash value with another hash value communicated with the results;
   validate the sled manifest when the hash value and the other hash value match; and
   invalidate the sled manifest when the hash value and the other hash value do not match.

5. The apparatus of claim 1, the memory comprising instructions for the pod management controller that when executed by the processor cause the processor to authenticate the results using a public key, the public key obtained from the sled manifest.

6. The apparatus of claim 1, the memory comprising instructions for the pod management controller that when executed by the processor cause the processor to add an indication of the physical resources in a database to permit the physical resources to process the workload.

7. The apparatus of claim 1, the memory comprising instructions for the pod management controller that when executed by the processor cause the processor to receive the sled manifest and the results of the authentication and verification operations via a secure link with the sled.

8. The apparatus of claim 1, the memory comprising instructions for the pod management controller that when executed by the processor cause the processor to generate a composed node comprising at least one of the physical resources of the sled.

9. The apparatus of claim 1, the memory comprising instructions for the pod management controller that when executed by the processor cause the processor to:
   send a platform certificate request to generate a platform certificate for a composed node to a certificate authority, the platform certificate to identify physical resources including the at least one of the physical resources used for the composed node; and receive a signed platform certificate.

10. The apparatus of claim 9, the memory comprising instructions for the pod management controller that when executed by the processor cause the processor to send the signed platform certificate for the composed node to a client device.

11. A non-transitory computer-readable storage medium, comprising a plurality of instructions, that when executed, enable processing circuitry to:

determine whether a sled manifest and results are authentic and valid, the results generated by an authentication and validation operation performed to authenticate and validate physical resources of a sled, the authentication and validation operation to generate a nonce, communicate the nonce to at least one of the physical resources of the sled, and authenticate a signed version of the nonce received from the at least one physical resource in response;

determine whether the results of the authentication and validation operation indicate the physical resources are authentic and valid;

permit the physical resources to process a workload in response to a determination that the sled manifest and results are authentic and valid, and the results indicate the physical resources are authentic and valid; and prevent the physical resources from processing the workload in response to a determination that at least one of the sled manifest is not authentic and valid, the results are not authentic and valid, and the results indicate the physical resources are not authentic and valid.

12. The non-transitory computer-readable storage medium of claim 11, comprising a plurality of instructions, that when executed, enable processing circuitry to:

receive the sled manifest comprising identifiers for the physical resources from the sled; and receive the results of the authentication and validation operation performed to authenticate and validate the physical resources from the sled.

13. The non-transitory computer-readable storage medium of claim 11, comprising a plurality of instructions, that when executed, enable processing circuitry to authenticate the sled manifest using a public key, the public key obtained from an original manufacturer of the sled or a trusted third party.

14. The non-transitory computer-readable storage medium of claim 11, comprising a plurality of instructions, that when executed, enable processing circuitry to:

generate a hash value based on the sled manifest;

compare the hash value with another hash value communicated with the results;

validate the sled manifest when the hash value and the other hash value match; and invalidate the sled manifest when the hash value and the other hash value do not match.

15. The non-transitory computer-readable storage medium of claim 11, comprising a plurality of instructions, that when executed, enable processing circuitry to authenticate the results using a public key, the public key obtained from the sled manifest.

16. The non-transitory computer-readable storage medium of claim 11, comprising a plurality of instructions, that when executed, enable processing circuitry to add an indication of the physical resources in a database to permit the physical resources to process the workload.

17. The non-transitory computer-readable storage medium of claim 11, comprising a plurality of instructions, that when executed, enable processing circuitry to receive the sled manifest and the results of the authentication and verification operations via a secure link with the sled.

18. The non-transitory computer-readable storage medium of claim 11, comprising a plurality of instructions, that when executed, enable processing circuitry to generate a composed node comprising at least one of the physical resources of the sled.

19. The non-transitory computer-readable storage medium of claim 11, comprising a plurality of instructions, that when executed, enable processing circuitry to:

send a platform certificate request to generate a platform certificate for a composed node to a certificate authority, the platform certificate to identify physical resources including the at least one of the physical resources used for the composed node; and receive a signed platform certificate.

20. The non-transitory computer-readable storage medium of claim 19, comprising a plurality of instructions, that when executed, enable processing circuitry to send the signed platform certificate for the composed node to a client device.

21. A computer-implemented method to verify and authentic physical resources, comprising:

determining whether a sled manifest and results are authentic and valid, the results generated by an authentication and validation operation performed to authenticate and validate physical resources of a sled, the authentication and validation operation to generate a nonce, communicate the nonce to at least one of the physical resources of the sled, and authenticate a signed version of the nonce received from the at least one physical resource in response;

determining whether the results of the authentication and validation operation indicate the physical resources are authentic and valid;

permitting the physical resources to process a workload in response to a determination that the sled manifest and results are authentic and valid, and the results indicate the physical resources are authentic and valid; and preventing the physical resources from processing the workload in response to a determination that at least one of the sled manifest is not authentic and valid, the results are not authentic and valid, and the results indicate the physical resources are not authentic and valid.

22. The computer-implemented method of claim 21, comprising:

receiving the sled manifest comprising identifiers for the physical resources from the sled;

authenticating the sled manifest using a public key, the public key obtained from an original manufacturer of the sled or a trusted third party; and receiving the results of the authentication and validation operation performed to authenticate; and authenticating the results using a public key, the public key obtained from the sled manifest and validating the physical resources from the sled.

23. The computer-implemented method of claim 21, comprising:

generating a hash value based on the sled manifest;

comparing the hash value with another hash value communicated with the results;

validating the sled manifest when the hash value and the other hash value match; and invalidating the sled manifest when the hash value and the other hash value do not match.

24. The computer-implemented method of claim 21, comprising:
   adding an indication of the physical resources in a database to permit the physical resources to process the workload.

25. The computer-implemented method of claim 21, comprising:
   generating a composed node comprising at least one of the physical resources of the sled.

* * * * *